(12) United States Patent
Tsuda et al.

(10) Patent No.: US 7,106,400 B1
(45) Date of Patent: Sep. 12, 2006

(54) METHOD OF MAKING LCD WITH ASPERITIES IN INSULATION LAYER UNDER REFLECTIVE ELECTRODE

(75) Inventors: Kazuhiko Tsuda, Nara (JP); Kazuhiro Ishizuka, Tenri (JP); Hiroyuki Ohgami, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 09/406,684

(22) Filed: Sep. 27, 1999

(30) Foreign Application Priority Data

| Sep. 28, 1998 | (JP) | ................................. 10-273244 |
| Sep. 28, 1998 | (JP) | ................................. 10-273245 |
| Jun. 16, 1999 | (JP) | ................................. 11-169338 |
| Jun. 16, 1999 | (JP) | ................................. 11-169339 |

(51) Int. Cl.
*G02F 1/1343* (2006.01)
*G02F 1/1335* (2006.01)

(52) U.S. Cl. ....................... 349/113; 349/114; 349/138; 349/143; 349/187

(58) Field of Classification Search ................ 349/113, 349/114, 138, 143, 187
See application file for complete search history.

(56) References Cited

U.S. PATENT DOCUMENTS

| 4,519,678 | A |   | 5/1985  | Komatsubara et al. |
| 5,204,765 | A | * | 4/1993  | Mitsui et al. ................ 349/113 |
| 5,396,351 | A | * | 3/1995  | Gessel ......................... 349/159 |
| 5,408,345 | A | * | 4/1995  | Mitsui et al. .................. 349/42 |
| 5,418,635 | A | * | 5/1995  | Mitsui et al. ................ 349/113 |
| 5,526,149 | A | * | 6/1996  | Kanbe et al. ................ 349/113 |
| 5,585,951 | A | * | 12/1996 | Noda et al. .................. 349/122 |
| 5,610,741 | A |   | 3/1997  | Kimura |
| 5,691,791 | A | * | 11/1997 | Nakamura et al. ........... 349/113 |
| 5,946,065 | A |   | 8/1999  | Tagusa et al. |
| 5,949,507 | A |   | 9/1999  | Shimada et al. |
| 5,986,738 | A |   | 11/1999 | Tagusa et al. |
| 6,163,405 | A | * | 12/2000 | Chang et al. ................ 359/599 |
| 6,181,397 | B1 | * | 1/2001  | Ichimura ..................... 349/113 |
| 6,380,995 | B1 |   | 4/2002  | Kim |
| 6,410,358 | B1 | * | 6/2002  | Noritake et al. .............. 438/29 |
| 6,424,399 | B1 |   | 7/2002  | Shimada et al. |
| 6,459,463 | B1 |   | 10/2002 | Kim et al. |

(Continued)

FOREIGN PATENT DOCUMENTS

JP          6-75238          3/1994

(Continued)

OTHER PUBLICATIONS

Japanese Office Action dated Dec. 12, 2003 (no translation).

(Continued)

*Primary Examiner*—Andrew Schechter
(74) *Attorney, Agent, or Firm*—Nixon & Vanderhye P.C.

(57) ABSTRACT

An object of the invention is to provide a method of manufacturing a liquid crystal display apparatus of high display quality by which a reflecting plate having excellent reflection characteristics can easily be manufactured with excellent reproducibility. A negative or positive photosensitive resin is applied to a substrate, asperities are formed in a first region of the applied photosensitive resin film by exposing the first region with various integrals of exposure amount so that the photosensitive resin in the first region is left in different film thicknesses and a concave is formed in a second region of the applied photosensitive resin film so that the photosensitive resin in the second region is left in a thickness smaller than those of the first region by exposing the second region with an integral of exposure amount different from those for the first region.

110 Claims, 20 Drawing Sheets

U.S. PATENT DOCUMENTS 6,469,759 B1 * 10/2002 Jang et al. .................. 349/113

FOREIGN PATENT DOCUMENTS

| JP | 9-90426 A | 4/1997 |
|---|---|---|
| JP | 9-127553 | 5/1997 |
| JP | 9-152597 | 6/1997 |
| JP | 9-186233 | 7/1997 |
| JP | 10-32327 | 2/1998 |
| JP | 2825713 B2 | 9/1998 |
| JP | 10 282482 | 10/1998 |
| JP | 10-282514 | 10/1998 |
| JP | 2000-89217 | 3/2000 |
| JP | 2000 89217 | 3/2000 |

OTHER PUBLICATIONS

English translation of JP 9-186233 (already considered by Examiner) (Jul. 1997).

English translation of JP 10-32327 (already considered by Examiner) (Feb. 1998).

* cited by examiner

FIG. 3A — FIG. 3K

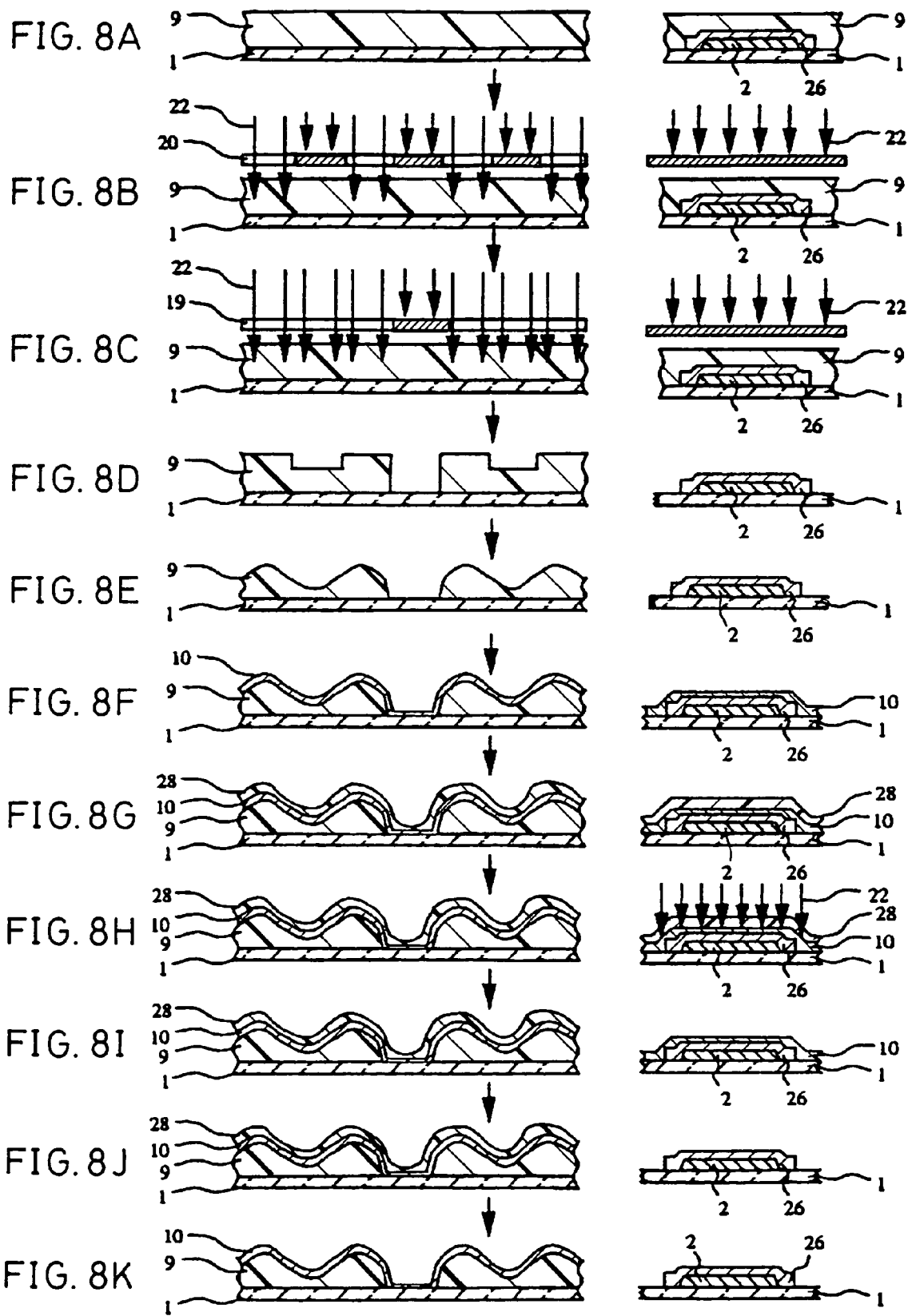

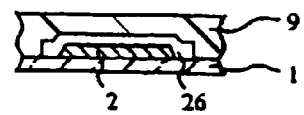
FIG. 9A
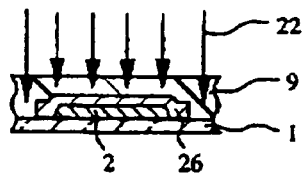
FIG. 9B
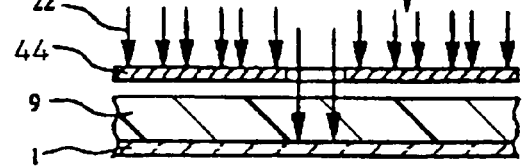
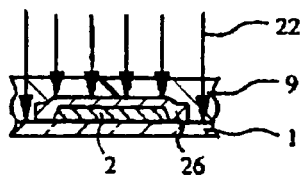
FIG. 9C
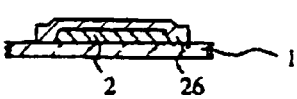
FIG. 9D
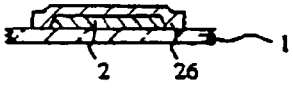
FIG. 9E
FIG. 9F
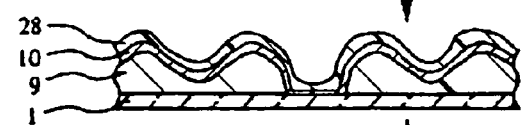
FIG. 9G
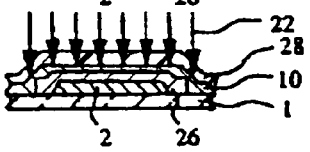
FIG. 9H
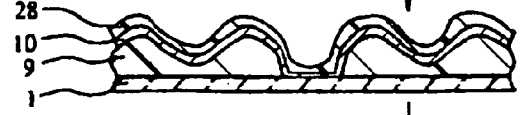
FIG. 9I
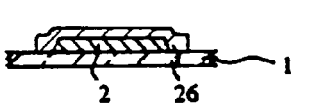
FIG. 9J
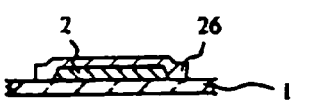
FIG. 9K FIG.14A 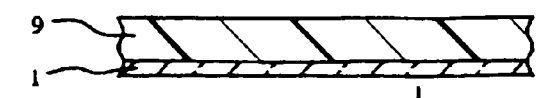 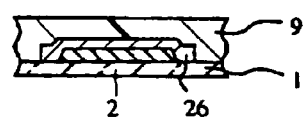
FIG.14B 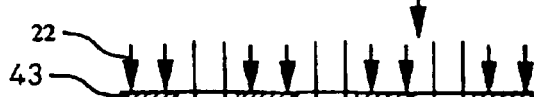 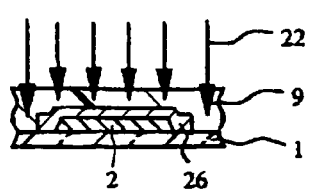
FIG.14C 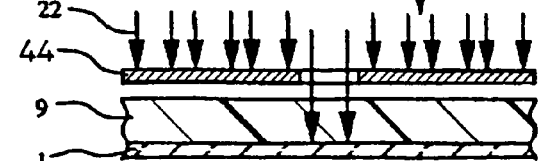 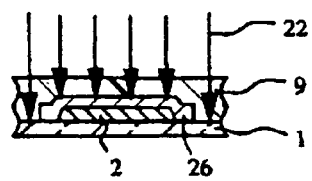
FIG.14D 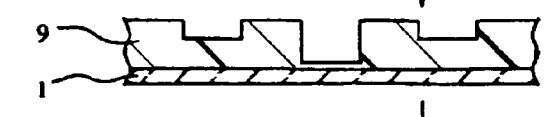 
FIG.14E  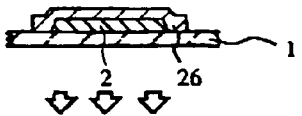
FIG.14F  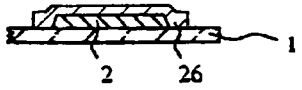
FIG.14G  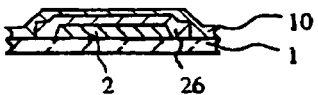
FIG.14H 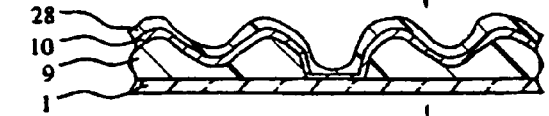 
FIG.14I  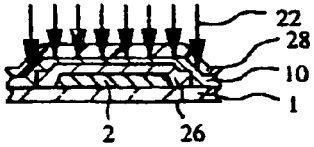
FIG.14J 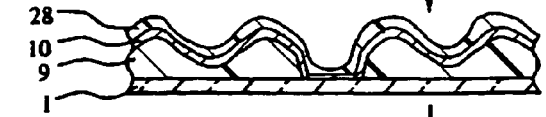 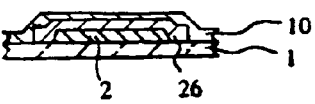
FIG.14K  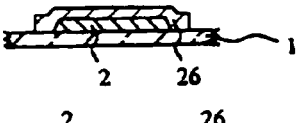
FIG.14L  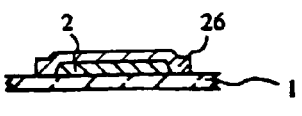

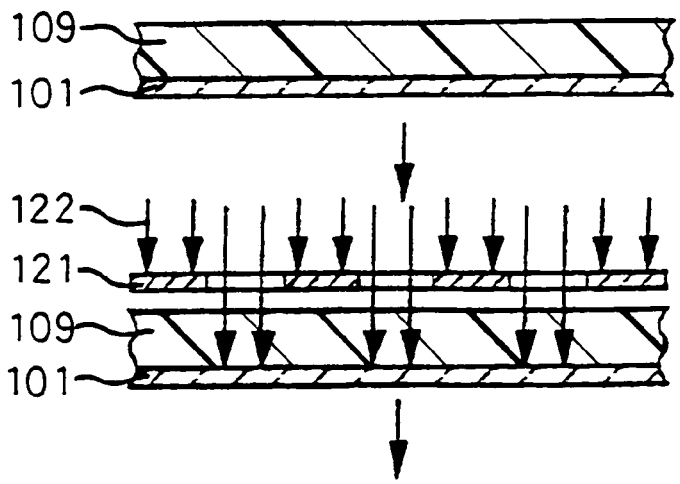
FIG. 23A (Prior Art)
FIG. 23B (Prior Art)
FIG. 23C (Prior Art)
FIG. 23D (Prior Art)
FIG. 23E (Prior Art)
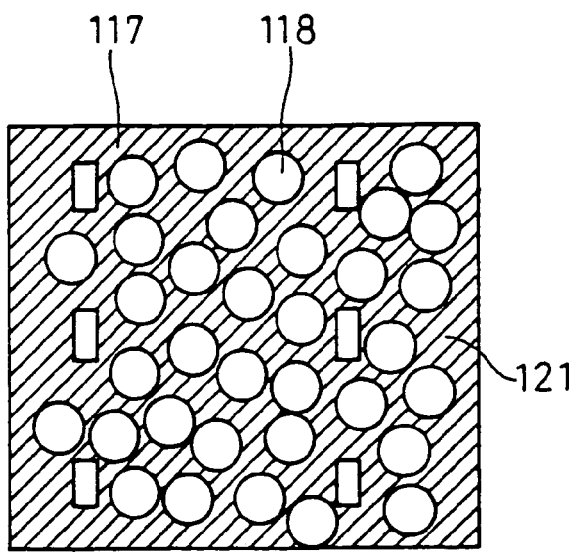
FIG. 24 (Prior Art)

US 7,106,400 B1

METHOD OF MAKING LCD WITH ASPERITIES IN INSULATION LAYER UNDER REFLECTIVE ELECTRODE

BACKGROUND OF THE INVENTION

1. Field of the Invention

The present invention relates to a method of manufacturing a liquid crystal display apparatus which carry out display by reflecting externally incident light.

2. Description of the Related Art

In recent years, application of liquid crystal display apparatuses to word processors, laptop personal computers, pocket televisions and the like has rapidly been progressing. Of the liquid crystal display apparatuses, reflective-type liquid crystal display apparatuses which carry out display by reflecting externally incident light are attracting attention because the reflective-type liquid crystal display apparatuses are low in power consumption, thin and capable of being reduced in weight since no backlight is necessary.

However, in the conventional reflective-type liquid crystal display apparatuses, the brightness and the contrast of the display are dependent on the use environment such as ambient brightness or the use condition. Therefore, at present, high expectations are placed on the realization of a reflective-type liquid crystal display apparatus that has excellent reflection characteristics, can easily be manufactured with excellent reproducibility and is high in display quality.

Japanese Unexamined Patent Publication JP-A 6-75238 (1994) discloses a technology to form random and high-density asperities on a reflecting electrode in order to improve the display quality of the reflective-type liquid crystal display apparatus.

According to this, a resin layer for adding fine asperities to a reflecting electrode comprises a first photosensitive resin layer patterned with random asperities and a second photosensitive resin layer for making the asperities smoother, and in a mask for patterning the first photosensitive resin layer, circular light intercepting portions are randomly disposed and the total area of the light intercepting portions is not less than 40% of the area of the reflecting plate.

By increasing the randomness as described above, the interference due to the repetitive pattern is prevented and the reflecting light is prevented from being colored, and by increasing the density of the asperities, the area of the flat part is reduced to thereby reduce the regular reflection component.

Moreover, Japanese Unexamined Patent Publication JP-A 9-90426 (1997) discloses a technology to simultaneously expose an asperity forming pattern and contact holes using only one layer of a photosensitive resin in order to reduce the process of manufacturing a reflective-type liquid crystal display apparatus.

A method of manufacturing a reflective-type liquid crystal display apparatus described in this patent publication will briefly be described with reference to the drawings. In this regard, FIG. 22 illustrates a mask used in this reference (JP 9-90426).

In the reflective-type liquid crystal display apparatus described in the above-mentioned patent publication, the following are provided: an aluminum pixel electrode disposed on the reflecting substrate; a transparent electrode opposed thereto; a color filter substrate supporting the transparent electrode; liquid crystal sandwiched therebetween; and a polarizing plate 116 disposed above the phase difference plate 115.

A method of manufacturing the reflecting substrate of the reflective-type liquid crystal display apparatus described in the above-mentioned patent publication will be described.

First, a photosensitive resin is applied to the substrate.

Then, exposure is carried out using the photomask shown in FIG. 22 having a large light-blocking contact hole portion and in addition thereto, a plurality of smaller light blocking portions at asperity forming portions Then, by development a resin configuration with respect to the mask pattern is formed.

Then, a thin film is formed as the reflecting electrode over the asperities defined in the resin.

SUMMARY OF THE INVENTION

The invention is made to solve the above-mentioned problems of the reflective-type liquid crystal display apparatus, and an object thereof is to provide a method of manufacturing a reflective-type liquid crystal display apparatus with which a liquid crystal display apparatus in which faulty electric continuity does not readily occur and that has excellent reflection characteristics can easily be manufactured with excellent reproducibility and the display quality improves.

The invention provides a method of manufacturing a liquid crystal display apparatus having, on one of a pair of substrates disposed so as to be opposed with a liquid crystal layer therebetween, reflecting means for reflecting incident light from the other substrate, comprising the steps of:

applying a photosensitive resin on one of the substrate;

forming asperities in a first region of the applied photosensitive resin film by exposing the first region with various integrals of exposure amount so that the photosensitive resin in the first region is left in different film thicknesses, and forming in a second region of the applied photosensitive resin film a concave portion so that the photosensitive resin in the second region is left in a thickness smaller than those of the first region by exposing the second region with an integral of exposure amount different from those for the first region;

developing the exposed photosensitive resin;

heat-treating the developed photosensitive resin; and forming a reflecting film on the heat-treated photosensitive resin.

According to the invention, by exposing the regions of different patterns of the photosensitive resin applied to the substrate with different integrals of exposure amount on an area basis, a smooth region having high-density asperities and other regions having no high-density asperities can be formed with a reduced number of steps.

That is, there are hardly any flat parts in the asperities formed region because the asperities formed region can be formed into a curved surface by a heat treatment under a condition that there is no part in which the photosensitive resin is completely removed. Consequently, excellent reflection characteristics with a reduced regular reflection component can be realized.

At the exposing step, since the negative photosensitive resin in the part intercepted from light by a photomask (light intercepted region) is readily soluble in a developing solution, circular or polygonal pillars or holes are formed, and since the negative photosensitive resin in the part not intercepted from light by the photomask (light transmitting region) is not readily soluble in the developing solution, a photosensitive resin film having asperities is formed on the substrate in correspondence with the light transmitting region and the light intercepted region of the photomask by developing the photosensitive resin with the developing solution after the exposure.

Moreover, at the exposing step, since the positive photosensitive resin in the part intercepted from light by a photomask (light intercepted region) is not readily soluble in a developing solution, circular or polygonal pillars or holes are formed, and since the positive photosensitive resin in the part not intercepted from light by the photomask (light transmitting region) is readily soluble in the developing solution, a photosensitive resin film having asperities is formed on the substrate in correspondence with the light transmitting region and the light intercepted region of the photomask by developing the photosensitive resin film with the developing solution after the exposure.

Moreover, in the method of manufacturing a liquid crystal display apparatus according to the invention, it is preferable that a reflecting electrode comprising the reflecting film is formed in the first region of the photosensitive resin film and that the reflecting electrode is connected to wiring formed in a lower layer of the reflecting electrode in the second region of the photosensitive resin film.

According to the invention, owing to the use of the photosensitive resin as an interlayer insulating film, the reflecting electrode can be manufactured by a minimum number of steps. By forming the reflecting electrode in the first region of the photosensitive resin film and connecting the reflecting electrode to the wiring formed in the lower layer of the reflecting electrode in the second region of the photosensitive resin film, that is, removing the resin in regions corresponding to contact holes for connecting the reflecting electrode and a liquid crystal driving device, the photosensitive resin is left over the entire display picture element region except the contact holes, so that asperities in which the area of the flat part is small and which is smooth over the entire picture element region can be formed. As a result, bright reflected light with reduced regular reflection can be obtained.

Moreover, in the method of manufacturing a liquid crystal display apparatus according to the invention, it is preferable that a terminal portion is formed in an outside display region on one of the substrates and that the second region of the photosensitive resin film is formed in the terminal portion.

According to the invention, owing to the use of the photosensitive resin as an interlayer insulating film and the formation of a light transmitting region corresponding to the terminal portion for inputting an external signal in the second region of the photosensitive resin, the terminal portion can be manufactured by a minimum number of steps.

Moreover, in the method of manufacturing a liquid crystal display apparatus according to the invention, it is preferable that the photosensitive resin is negative, and that the step of exposing the photosensitive resin includes a step of exposing the photosensitive resin using a photomask having a light transmitting portion, a light intercepting portion and a semi-light transmitting portion, to form the first region in regions corresponding to the light transmitting portion and semi-light transmitting portion of the photomask, and the second region in a region corresponding to the light intercepting portion of the photomask.

According to the invention, since the step of exposing the photosensitive resin includes the step of exposing the photosensitive resin using the photomask having the light transmitting portion, the light intercepting portion and the semi-light transmitting portion, to form the first region in the regions corresponding to the light transmitting portion and semi-light transmitting portion of the photomask and the second region in the region corresponding to the light intercepting portion of the photomask, the number of exposures can be reduced to one.

Moreover, in the method of manufacturing a liquid crystal display apparatus according to the invention, it is preferable that the photosensitive resin is positive, and that the step of exposing the photosensitive resin includes a step of exposing the photosensitive resin using a photomask having a light transmitting portion, a light intercepting portion and a semi-light transmitting portion, to form the first region in regions corresponding to the light intercepting portion and semi-light transmitting portion of the photomask, and the second region in a region corresponding to the light transmitting portion of the photomask.

According to the invention, since the step of exposing the photosensitive resin includes the step of exposing the photosensitive resin using the photomask having the light transmitting portion, the light intercepting portion and the semi-light transmitting portion, to form the first region in the regions corresponding to the light intercepting portion and semi-light transmitting portion of the photomask and the second region in the region corresponding to the light transmitting portion of the photomask, the number of exposures can be reduced to one.

Moreover, in the method of manufacturing a liquid crystal display apparatus according to the invention, it is preferable that the step of exposing the photosensitive resin includes a step of exposing the photosensitive resin using a first photomask and a step of exposing the photosensitive resin using a second photomask, to form the first region and the second region with the first and second photomasks, respectively.

According to the invention, since the step of exposing the photosensitive resin includes the step of exposing the photosensitive resin using the first photomask and the step of exposing the photosensitive resin using the second photomask, to form the first and second regions by the first and second photomasks, it is made possible to use photomasks composed of only a light transmitting portion and a light intercepting portion, with the result that the design and manufacture of the photomasks is facilitated and the number of exposing steps can be reduced.

Moreover, in the method of manufacturing a liquid crystal display apparatus according to the invention, it is preferable that the exposure amount at the step of exposing the photosensitive resin using the first photomask and the exposure amount at the step of exposing the photosensitive resin using the second photomask are the same.

According to the invention, since the exposure with the first photomask and the exposure with the second photomask are carried out in the same exposure amount, the light quantity adjustment is facilitated, with the result that the throughput of the exposing step can be enhanced.

Moreover, in the method of manufacturing a liquid crystal display apparatus according to the invention, it is preferable that uniform and low-illuminance exposure is performed at the step of exposing the photosensitive resin using the first photomask, while uniform and high-illuminance exposure is performed at the step of exposing the photosensitive resin using the second photomask.

According to the invention, in the case where negative photosensitive resin is used, since uniform and low-illuminance exposure is performed at the step of exposing the photosensitive resin using the first photomask and uniform and high-illuminance exposure is performed at the step of exposing the photosensitive resin using the second photomask, it becomes possible to expose only a convex formed region in the first region at a high illuminance, so that it is possible that the photosensitive resin is completely left in the first region with more reliability. Here, the high-illuminance exposure indicates an exposure of such an extent of exposure amount that cross-linking of the resin sufficiently progresses in the negative photosensitive resin and the left film amount after the development is larger than substantially 50% of the film thickness before the development, and the low-illuminance exposure indicates an exposure of such an extent of exposure amount that cross-linking of the resin does not sufficiently progress in the negative photosensitive resin and the left film amount after the development is 0% or more and less than 50%, preferably, 10% or more and less than 50% of the film thickness before the development.

More specifically, in the negative photosensitive resin formed on the substrate, owing to the low-illuminance exposure with the first photomask, cross-linking of the photosensitive resin in the part subjected to the low-illuminance exposure with the first photomask does not sufficiently progress, so that the film of the photosensitive resin in the part subjected to the low-illuminance exposure is uniformly reduced in thickness by the development with a development solution after the exposure.

Moreover, in the negative photosensitive resin formed on the substrate, by performing the high-illuminance exposure using the second photomask, cross-linking of the photosensitive resin in the part exposed at a high illuminance using the second photomask sufficiently progresses, so that a convex portion being higher by one step than the unexposed part by the second photomask is formed by the development with the developing solution after the exposure and it is possible to form smooth asperities by the resin being deformed in a succeeding heat treatment.

As described above, by performing the high-illuminance exposure, the low-illuminance exposure and development on one layer of negative photosensitive resin and then, heat-treating the photosensitive resin, the asperities of the photosensitive resin formed on the substrate are deformed, so that continuous, high-density and smooth asperities without any flat part are formed on the substrate.

In the case where positive photosensitive resin is used, by performing the uniform and low-illuminance exposure at the step of exposing the photosensitive resin using the first photomask and performing the uniform and high-illuminance exposure at the step of exposing the photosensitive resin using the second photomask, it becomes possible that only the second region is exposed at a high illuminance independently of an optimum exposure condition for the first region, so that it is possible to completely remove the photosensitive resin with more reliability in the first region. Here, the high-illuminance exposure indicates an exposure performed with an exposure amount where a sensitizer that restrains the dissolution of the resin in the developing solution is made sufficiently soluble in the positive photosensitive resin and the left film amount after the development is substantially 0%, and the low-illuminance exposure indicates an exposure performed with an exposure amount where the solubilization of the sensitizer that restrains the dissolution of the resin in the developing solution is not sufficiently performed in the positive photosensitive resin and the left film amount after the development is 0% or more and less than 50%, preferably, not in a range of from 10% to 50% of the film thickness before the development.

More specifically, in the positive photosensitive resin formed on the substrate, owing to the low-illuminance exposure with the first photomask, the sensitizer in the part subjected to the exposure of a low illuminance with the first photomask is not sufficiently solubilized, so that the film of the part subjected to the low-illuminance exposure is uniformly reduced in thickness by the development with the developing solution after the exposure.

Moreover, in the positive photosensitive resin formed on the substrate, owing to the high-illuminance exposure with the second photomask, the sensitizer in the part subject to the exposure of a high illuminance using the second photomask is sufficiently solubilized, so that the photosensitive resin on the substrate is completely removed by the development with the developing solution after the exposure. This enables the connection between the reflecting electrode formed at a succeeding step and a TFT drain electrode.

As described above, owing to the high-illuminance exposure, the low-illuminance exposure and development on one layer of a positive photosensitive resin and heat-treatment of the photosensitive resin, the asperities of the photosensitive resin formed on the substrate are deformed by heat, with the result that continuous, high-density and smooth asperities without any flat part are formed on the substrate.

Further, by forming the reflecting electrode on the heat-treated photosensitive resin having the smooth asperities, excellent reflecting means with a small regular reflection component can be formed.

In the invention, the order of the steps of the low-illuminance exposure and the high-illuminance exposure, that is, the order of the first exposing step and the second exposing step may be opposite to the above-described order.

As the process from the exposing step to the developing step, the following two are considered: the process from exposure (the low-illuminance exposure and the high-illuminance exposure) to development; and the process from exposure (the low-illuminance exposure or the high-illuminance exposure) through development and exposure (the high-illuminance exposure or the low-illuminance exposure) to development. In the invention, either of the two processes can be used. However, the former process is preferable in view of the simplification of the process.

Moreover, in the method of manufacturing a liquid crystal display apparatus according to the invention, it is preferable that circular or polygonal regions are irregularly disposed in the first or second photomask and that the total area of the circular or polygonal regions is in a range of from 20% to 40% of the total area of the photomask.

According to the invention, since the circular or polygonal regions are irregularly disposed in the first or second photomask, the total area of the circular or polygonal regions is in a range of from 20% to 40% of the total area of the photomask and the circular or polygonal regions are irregularly disposed, the periodicity of the pattern of the asperities of the photosensitive resin formed on the substrate is eliminated, so that the light interference phenomenon can be prevented. As a result, white scattered light without any color can be obtained. Moreover, since the scattered light from the asperities does not biased in a specific direction, uniform scattered light can be obtained.

Since the total area of the circular or polygonal regions in the first or second photomask is in a range of from 20% to 40% of the photomask, the angle of inclination of the asperities of the photosensitive resin formed on the substrate can be controlled so that the light can efficiently be used.

Here, the total area of the photomask concretely means the total area of the reflecting electrode. In the case where the area of the circular or polygonal regions in the first or second photomask is not less than 40%, when the circular or polygonal regions are randomly disposed, adjoining circular or polygonal regions overlap each other into a large pattern, so that the pattern density decreases as a whole and the ratio of the area of the flat part increases. As a result, a reflecting plate with a large regular reflection component is formed. In the case where the area of the circular or polygonal regions in the first or second photomask is not more than 20%, when the circular or polygonal regions are randomly disposed, the distances between adjoining circular or polygonal regions are too large, so that the distances between convex portions and convex portions or concave portions and concave portions of the configuration of the photosensitive resin formed by development are too large and flat parts are left between convex portions or concave portions when the resin is deformed by heating. As a result, a reflecting plate with a large regular reflection component is formed. From these, in the invention, the total area of the circular regions in the first or second photomask is in a range of from 20% to 40% of the total area of the photomask.

A photomask having the above-described characteristics is selected as the second photomask when negative photosensitive resin is used, and is selected as the first photomask when a positive photosensitive resin is used.

Moreover, in the method of manufacturing a liquid crystal display apparatus according to the invention, it is preferable that the circular or polygonal regions disposed in the first or second photomask are irregularly disposed so that the center-to-center distances between adjoining regions are in a range of from 5 μm to 50 μm.

According to the invention, by irregularly disposing the circular or polygonal regions disposed in the first or second photomask so that the center-to-center distances between adjoining regions are in a range of from 5 μm to 50 μm, a sufficient number of asperity patterns can be disposed for one picture element of the liquid crystal display apparatus, so that scattered light can be obtained in which there is no difference in characteristics between picture elements.

In the case where adjoining circular or polygonal regions are disposed so as not to overlap each other, patterns in which the center-to-center distance is not more than 5 μm are not resolved but become flat because of the limit of resolution of the stepper, so that a reflecting plate with a large regular reflection component is formed. Generally, in a liquid crystal display apparatus, since the size of one picture element is not more than approximately 100 μm×300 μm, to dispose approximately ten or more convex portions or concave portions for one picture element in order to obtain uniform scattering property, it is necessary that the center-to-center distance is substantially not more than 50 μm. When the center-to-center distance is larger than 50 μm, since the distances between the circular regions are large, the ratio of the area of the flat part increases, so that a reflecting plate with a large regular reflection component is formed. From these, in the invention, the circular or polygonal regions disposed in the first or second photomask are irregularly disposed so that the center-to-center distances between adjoining circular or polygonal regions are in a range of from 5 μm to 50 μm.

According to the invention, by exposing one layer of a photosensitive resin applied to the substrate with the different integrals of exposure amount on an area basis, smooth and high-density asperities can be formed, so that ideal reflecting means with a reduced flat area and a small regular reflection component can be formed. Consequently, the number of photoprocesses of the photosensitive resin can be reduced to thereby reduce the cost necessary for the manufacture.

In the invention, since a negative photosensitive resin is used, the resin in a part that is not exposed because of the presence of dust or the like can be removed by development, so that electric continuity is ensured even when dust or the like adheres to the contact hole portions and the signal input terminal portion.

In the invention, since a positive photosensitive resin is used, when the low-illuminance exposure is performed with the photomask, the reaction progresses from the surface of the photosensitive resin, so that dissolution readily progresses from the surface when the reacting portion is dissolved by the development, and in the case where it is necessary to control the film reduction amount like in the invention, the control can easily be performed while the adhesion to the substrate is maintained.

BRIEF DESCRIPTION OF THE DRAWINGS

Other and further objects, features, and advantages of the invention will be more explicit from the following detailed description taken with reference to the drawings wherein:

FIGS. 8A to 8K are cross-sectional views showing a manufacturing process of the reflecting substrate 23 used in the reflective-type liquid crystal display apparatus according to Embodiment 3 of the invention;

FIGS. 9A to 9K are cross-sectional views showing a manufacturing process of a reflecting substrate 23 used in the reflective-type liquid crystal display apparatus according to Embodiment 4 of the invention;

FIGS. 14A to 14L are cross-sectional views showing a manufacturing process of the reflecting substrate 23 used in a reflective-type liquid crystal display apparatus according to a Embodiment 6 of the invention;

FIGS. 23A to 23E are cross-sectional views showing the manufacturing process of the reflecting substrate 123 in the conventional reflective-type liquid crystal display apparatus; and FIG. 24 is a schematic plan view showing the patterns of the light transmitting portions 118 and the light intercepting portion 117 of the conventional photomask 121.

DETAILED DESCRIPTION OF THE PREFERRED EMBODIMENTS

Figure 1:
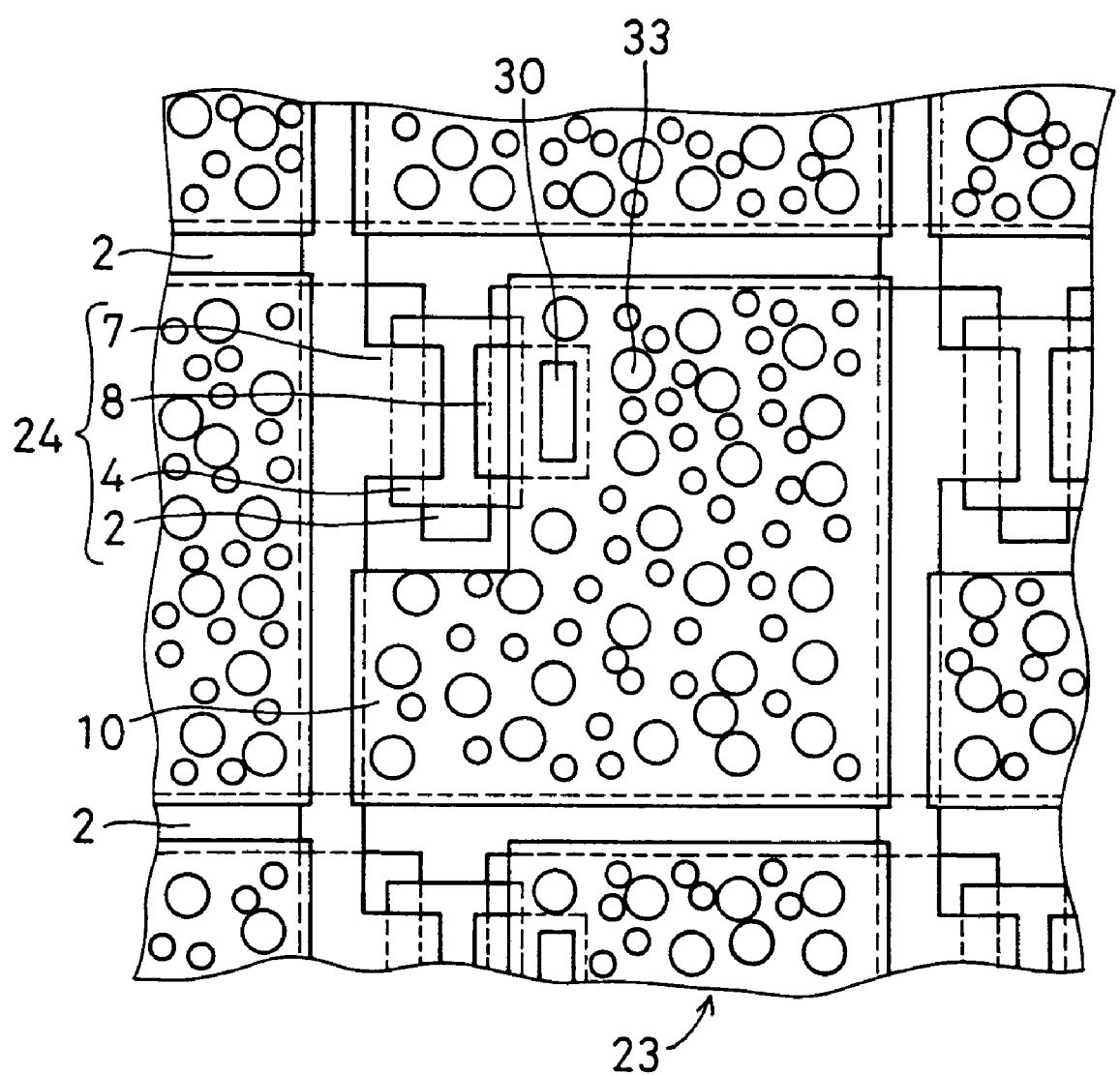
FIG. 1 is a plan view of a reflecting substrate 23 used in a reflective-type liquid crystal display apparatus according to Embodiment 1 of the invention.

Now referring to the drawings, preferred embodiments of the invention are described below.

Embodiment 1

Figure 2:
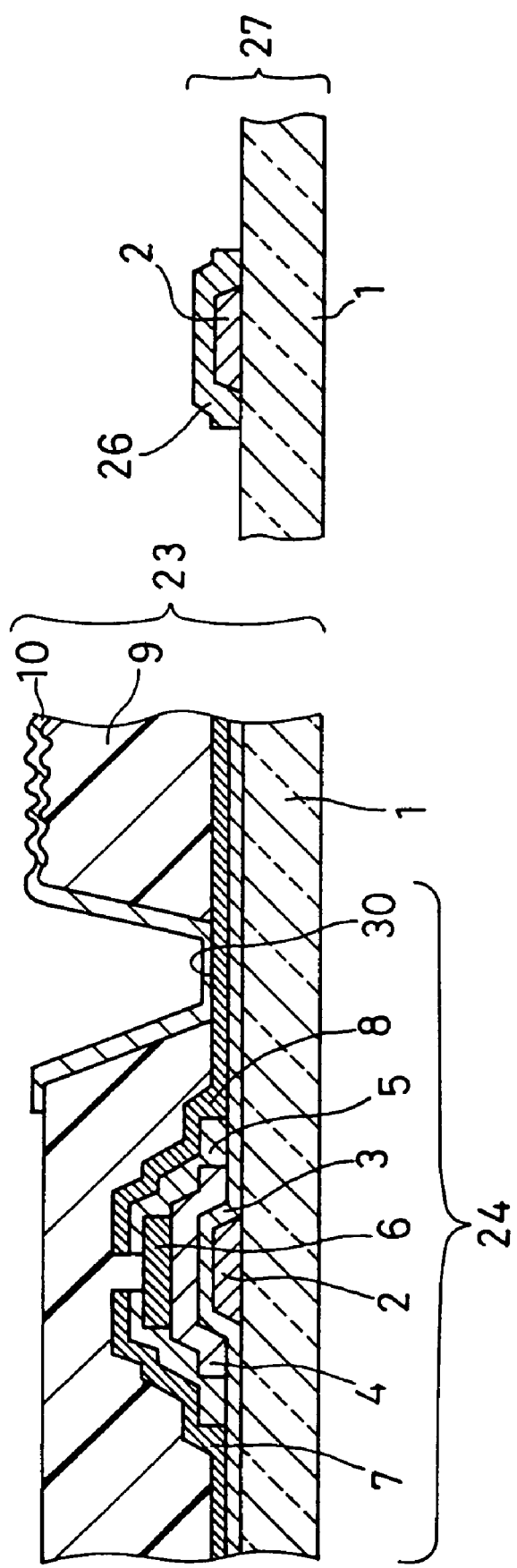
FIG. 2 is a cross-sectional view of the reflecting substrate 23 used in the reflective-type liquid crystal display apparatus according to Embodiment 1 of the invention.

FIG. 1 is a plan view showing a reflecting substrate 23 of a reflective-type liquid crystal display apparatus according to Embodiment 1. FIG. 2 is a cross-sectional view of the reflecting substrate 23 shown in FIG. 1. FIGS. 3A to 3K are cross-sectional views showing the flow of the manufacturing process of the substrate 23.

As shown in FIGS. 1 and 2, on the reflecting substrate 23 used in the reflective-type liquid crystal display apparatus according to this embodiment, a reflecting electrode 10 is formed, and the surface thereof has smooth asperities comprising circular concave or convex portions 33. On a glass substrate 1, an amorphous silicon transistor is formed as a liquid crystal driving device 24. The liquid crystal driving device 24 comprises Ta as a gate electrode 2 on the glass substrate 1, SiNx as a gate insulating layer 3, a-Si as a semiconductor layer 4, n-type a-Si as an n-type semiconductor layer 5, Ti as a source electrode 7, and Ti as a drain electrode 8.

A signal input terminal portion 27 for inputting signals to a gate bus line and a source bus line comprises a terminal portion electrode 2 of Ta and a terminal connection electrode 26 of ITO formed by patterning simultaneously with the gate bus line and the gate electrode.

A manufacturing process of the reflecting substrate 23 of the reflective-type liquid crystal display apparatus according to this embodiment will be described with reference to FIGS. 3A to 3K. In these figures, the pixel region is shown on the left side, and the signal input terminal portion region is shown on the right side.

Figure 3:
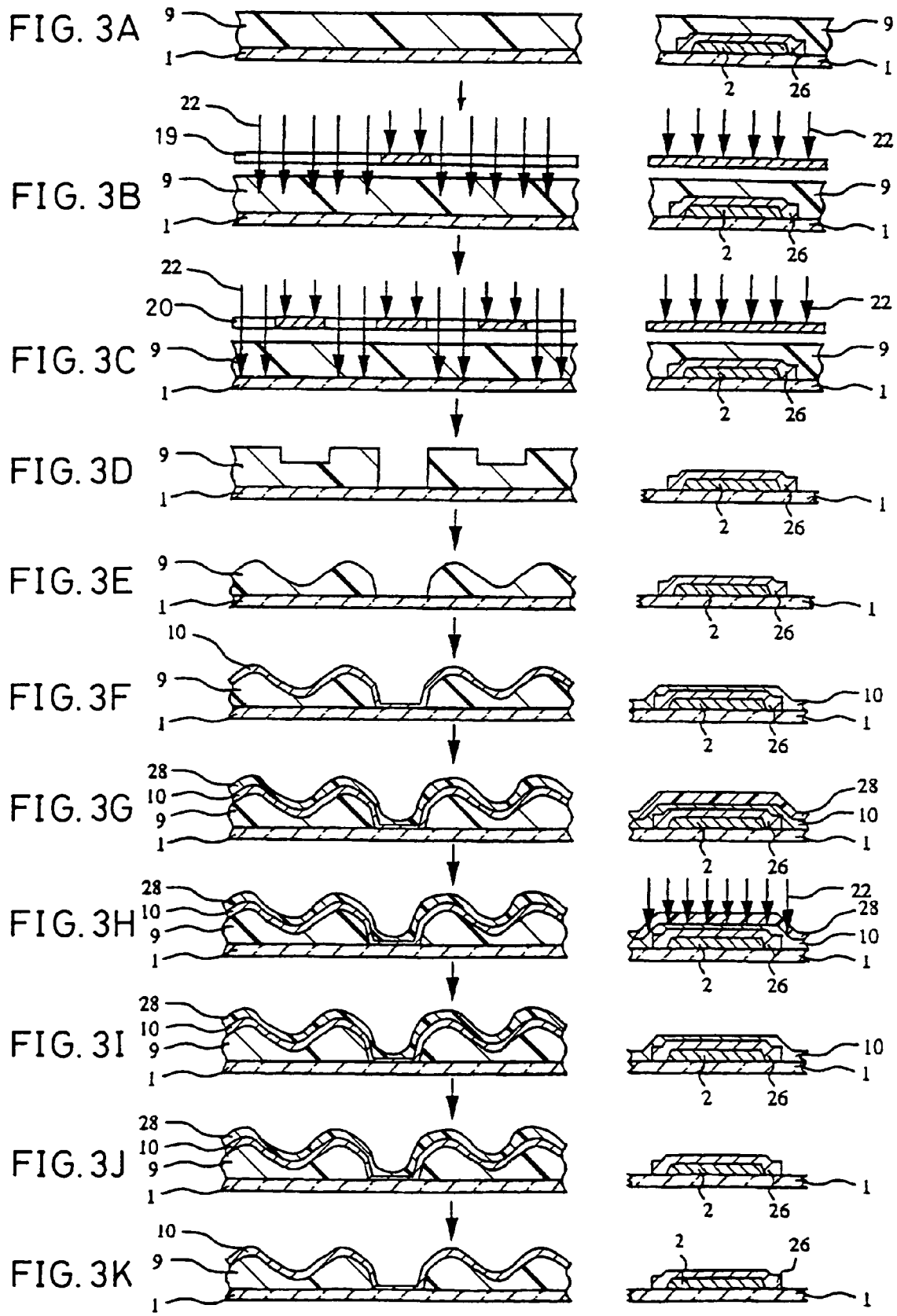
FIGS. 3A to 3K are cross-sectional views showing a manufacturing process of the reflecting substrate 23 used in the reflective-type liquid crystal display apparatus according to Embodiment 1 of the invention.

First, as shown in FIG. 3A, a negative photosensitive resin 9 (the name of the product: FE301N manufactured by Fuji Film Olin) is applied to the glass substrate 1 in a thickness of 1 to 5 µm. In this embodiment, the resin 9 was applied in a thickness of 3 µm.

Figure 4:
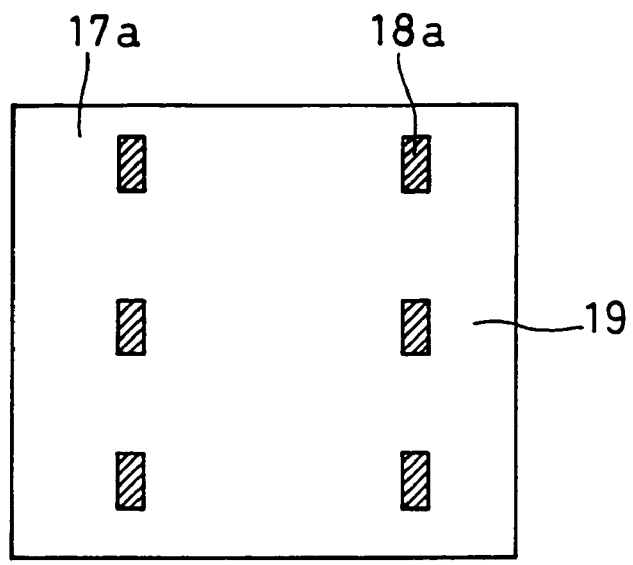
FIG. 4 is a schematic plan view showing the patterns of a light transmitting portion 17a and light intercepting portions 18a of a first photomask 19 according to Embodiment 1 of the invention.

Then, by using a first photomask 19 in which light intercepting portions 18a corresponding to contact hole portions 30 were disposed as shown in FIG. 4, the region other than the contact hole portions was uniformly exposed at a low illuminance as shown in FIG. 3B. In the first photomask 19, the region other than the light intercepting portions 18a is a light transmitting portion 17a. It is desirable that the exposure amount at this time is 20 mj to 100 mj. In this embodiment, exposure was performed with an exposure amount of 40 mj. In the plan view of FIG. 4, the light intercepting portions 18a are hatched.

Figure 5:
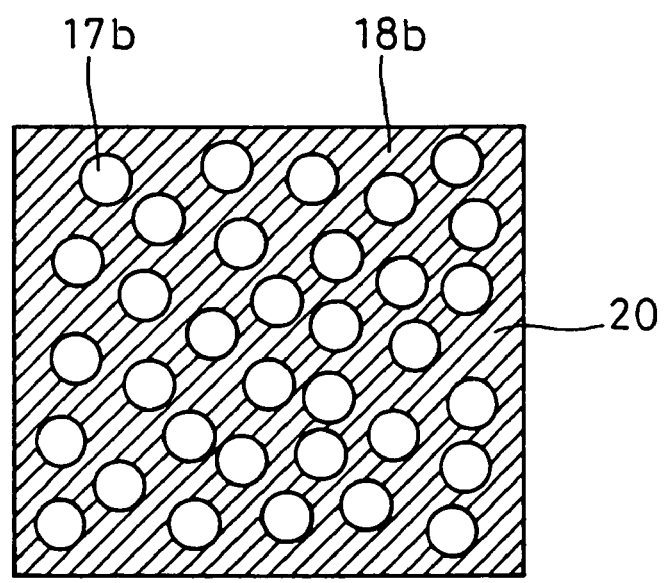
FIG. 5 is a schematic plan view showing the patterns of light transmitting portions 17b and a light intercepting portion 18b of a second photomask 20 according to Embodiment 1 of the invention.

Then, by using a second photomask 20 in which the area of light transmitting portions 17b was in a range of from 20% to 40% as circular regions in the region other than the contact hole portions 30 as shown in FIG. 5, the region other than the contact hole portions 30 was uniformly exposed at a high illuminance as shown in FIG. 3C. In the second photomask 20, the region other than the light transmitting portions 17b is a light intercepting portion 18b. It is desirable that the exposure amount at this time is 160 mj to 500 mj. In this embodiment, exposure was performed with an exposure amount of 240 mj. At this time, the circular or polygonal light transmitting portions 17b of the second photomask 20 were randomly disposed so that the center-to-center distances between adjoining light transmitting portions 17b were in a range of from 5 µm to 50 µm, preferably, 10 µm to 20 µm. In the plan view of FIG. 5, the light intercepting portion 18b is hatched.

At this time, the first and the second photomasks 19 and 20 were structured so as to intercept the signal input terminal portion 27 from light as well as the contact holes.

Then, as shown in FIG. 3D, by performing development with a developing solution TMAH (tetramethylammonium-hydrooxide) manufactured by Tokyo Ohka Kogyo Co., Ltd., the resin in the unexposed part (the contact hole portions and the signal input terminal portion) was completely removed, approximately 40%, with respect to the initial film thickness, of the resin in the part exposed at a low illuminance was left, and approximately 80%, with respect to the initial film thickness, of the resin in the part exposed at a high illuminance was left.

Then, as shown in FIG. 3E, by performing a heat treatment at 200° C. for 60 minutes, the resin of the above-described condition was deformed into smooth asperities.

Then, as shown in FIG. 3F, an Al thin film was formed by sputtering as the reflecting electrode 10 on the substrate 1 in a thickness of 2000 Å, and as shown in FIGS. 3G to 3K, patterning was performed so that one reflecting electrode 10 corresponds to one transistor.

Specifically, the patterning of the Al electrode serving as the reflecting electrode 10 was carried out in such a manner that: a photoresist 28 was applied as shown in FIG. 3G; a portion to be removed for separation of each pixel electrode and the signal input terminal portion 27 were exposed as shown in FIG. 3H; and development, etching and exfoliation were performed as shown in FIGS. 3I to 3K.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

Embodiment 2

Hereinafter, a reflective-type liquid crystal display apparatus according to Embodiment 2 of the invention will be described with reference to the drawings. The reflecting substrate 23 of the reflective-type liquid crystal display apparatus according to this embodiment is the same as the reflecting substrate 23 shown in FIG. 1 but is formed by a different manufacturing method. The manufacturing method will be described with reference to the cross-sectional views shown in FIGS. 6A to 6J.

FIGS. 6A to 6J are cross-sectional views showing a manufacturing process of the reflecting substrate 23 used in the reflective-type liquid crystal display apparatus according to Embodiment 2. In these figures, the pixel region is shown on the left side, and the signal input terminal portion region is shown on the right side.

Figure 6A:
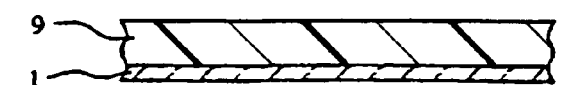
FIGS. 6A to 6J are cross-sectional views showing a manufacturing process of the reflecting substrate 23 used in a reflective-type liquid crystal display apparatus according to Embodiment 2 of the invention.

First, as shown in FIG. 6A, the negative photosensitive resin 9 (the name of the product: FE301N manufactured by Fuji Film Olin) is applied to the glass substrate 1 in a thickness of 1 to 5 μm. In this embodiment, the resin 9 was applied in a thickness of 3 μm.

Figure 6B:
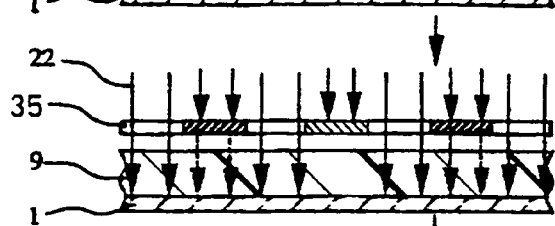
Figure 7:
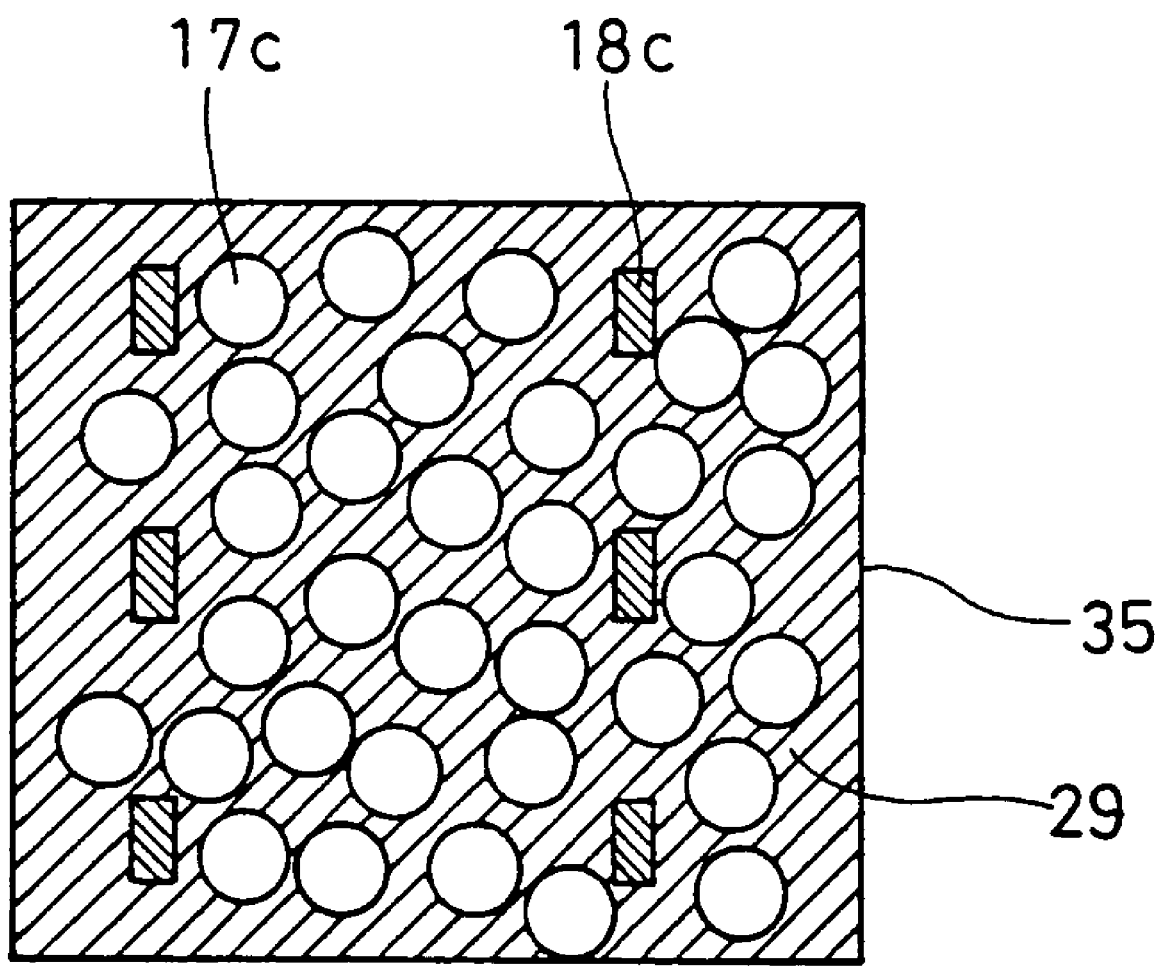
FIG. 7 is a schematic plan view showing the pattern of a photomask 35 according to Embodiment 2 of the invention.

Then, using a photomask 35 in which light transmitting portions 17c, light intercepting portions 18c and a semi-light transmitting portion 29 other than the portions 17c and 18c are mixed and the area of the light transmitting portions 17c is in a range of from 20% to 40% as circular regions as shown in FIG. 7, exposure was uniformly performed at a high illuminance as shown in FIG. 6B. It is preferable that the exposure amount at this time is in a range of from 160 mj to 500 mj. In this embodiment, exposure was performed with an exposure amount of 240 mj. At this time, the area of the circular or polygonal light transmitting portions 17c of the photomask 35 was 30%, the light transmitting portions 17c were randomly disposed so that the center-to-center distances between adjoining light transmitting portions 17c were in a range of from 5 μm to 50 μm, preferably, 10 μm to 20 μm, the light intercepting portions 18c were disposed in the regions corresponding to the contact holes 30, and the semi-light transmitting portion 29 whose light transmittance was 17% of that of the light transmitting portions 17c was disposed in the region other than the portions 17c and 18c. Although not shown, the region other than the display region is a light intercepting region. In the plan view of FIG. 7, the semi-light transmitting portion 29 and the light intercepting portions 18c are hatched.

Figure 6C:
Figure 6D:

The succeeding process is similar to that of the above-described Embodiment 1. Development was performed as shown in FIG. 6C, and a heat treatment was performed as shown in FIG. 6D, so that smooth asperities were formed by the resin being deformed.

Figure 6E:
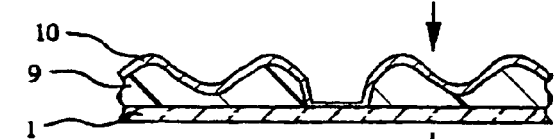
Figure 6F:
Figure 6G:
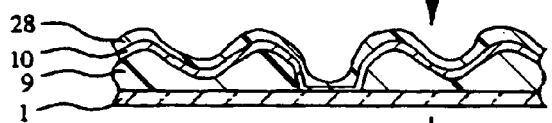
Figure 6H:
Figure 6I:
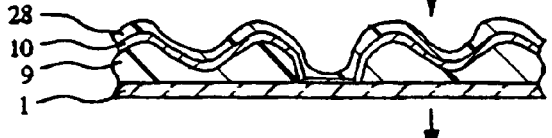
Figure 6J:

Then, as shown in FIG. 6E, an Al thin film was formed as the reflecting electrode 10 on the substrate 1, and as shown in FIGS. 6F to 6J, patterning was performed so that one reflecting electrode 10 corresponds to one transistor.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

In the reflective-type liquid crystal display apparatus according to this embodiment, while the reflecting electrode having smooth and high-density reflecting asperities is formed like in the above-described Embodiment 1, the number of exposures can further be reduced by using the photomask having the semi-light transmitting portion in the photoprocess of the photosensitive resin, so that the cost necessary for the manufacture of the reflecting substrate 23 can be reduced.

Embodiment 3

Hereinafter, a reflective-type liquid crystal display apparatus according to Embodiment 3 of the invention will be described with reference to the drawings. The reflecting substrate 23 of the reflective-type liquid crystal display apparatus according to this embodiment is the same as the reflecting substrate 23 shown in FIG. 1 but is formed by a different manufacturing method. The manufacturing method will be described with reference to the cross-sectional views shown in FIGS. 8A to 8K.

FIGS. 8A to 8K are cross-sectional views showing a manufacturing process of the reflecting substrate 23 used in the reflective-type liquid crystal display apparatus according to Embodiment 3. In these figures, the pixel region is shown on the left side, and the signal input terminal portion region is shown on the right side.

First, as shown in FIG. 8A, the negative photosensitive resin 9 (the name of the product: FE301N manufactured by Fuji Film Olin) is applied to the glass substrate 1 in a thickness of 1 to 5 μm. In this embodiment, the resin 9 was applied in a thickness of 3 μm.

Then, by using the second photomask 20 in which the area of the light transmitting portions 17b was in a range of from 20% to 40% as circular regions in the region other than the contact hole portions 30 as shown in FIG. 5, the region other than the contact hole portions 30 was uniformly exposed at a low illuminance as shown in FIG. 8B. It is desirable that the exposure amount at this time is 20 mj to 100 mj. In this embodiment, exposure was performed with an exposure amount of 40 mj. At this time, the circular or polygonal light transmitting portions 17b of the second photomask 20 were randomly disposed so that the center-to-center distances between adjoining light transmitting portions 17b were in a range of from 5 μm to 50 μm, preferably, 10 μm to 20 μm.

Then, by using the first photomask 19 in which the light intercepting portions 18a corresponding to the contact hole portions 30 were disposed as shown in FIG. 4, the region other than the contact hole portions 30 was uniformly exposed with an exposure amount of 40 mj which was the same as that in the above-described first exposure process as shown in FIG. 8C. The first and the second photomasks 19 and 20 were structured so as to intercept the signal input terminal portion 27 from light as well as the contact hole portions.

Then, as shown in FIG. 8D, by performing development with a developing solution TMAH (tetramethylammoniumhydrooxide) manufactured by Tokyo Ohka Kogyo Co., Ltd., the resin in the unexposed part (the contact hole portions and the signal input terminal portion) was completely removed, approximately 30%, with respect to the initial film thickness, of the resin in the part exposed once was left, and approximately 70%, with respect to the initial film thickness, of the resin in the part exposed twice was left.

Then, as shown in FIG. 8E, by performing a heat treatment at 200° C. for 60 minutes, the resin of the above-described condition was deformed into smooth asperities.

The succeeding process is similar to that of the above-described Embodiments 1 and 2. As shown in FIG. 8F, an Al thin film was formed as the reflecting electrode 10 on the substrate 1, and as shown in FIGS. 8J to 8K, patterning was performed so that one reflecting electrode 10 corresponds to one transistor.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

In the reflective-type liquid crystal display apparatus according to this embodiment, while the reflecting electrode having smooth and high-density reflecting asperities is formed like in the above-described Embodiment 1, the throughput of the apparatus improves by performing the first and the second exposures with the same exposure amount in the photoprocess of the photosensitive resin, and the cost necessary for the manufacture of the reflecting substrate 23 can be reduced.

Embodiment 4

Hereinafter, a reflective-type liquid crystal display apparatus according to Embodiment 4 of the invention will be described with reference to the drawings. The reflecting substrate 23 of the reflective-type liquid crystal display apparatus according to this embodiment is the same as the reflecting substrate 23 shown in FIG. 1 but is formed by a different manufacturing method. The manufacturing method will be described with reference to the cross-sectional views shown in FIGS. 9A to 9K.

FIGS. 9A to 9K are cross-sectional views showing a manufacturing process of the reflecting substrate 23 used in the reflective-type liquid crystal display apparatus according to Embodiment 4. In these figures, the pixel region is shown on the left side, and the signal input terminal portion region is shown on the right side.

First, as shown in FIG. 9A, a positive photosensitive resin 9 (the name of the product: OFPR-800 manufactured by Tokyo Ohka Kogyo Co., Ltd.) is applied to the glass substrate 1 in a thickness of 1 to 5 μm. In this embodiment, the resin 9 was applied in a thickness of 3 μm.

Figure 10:
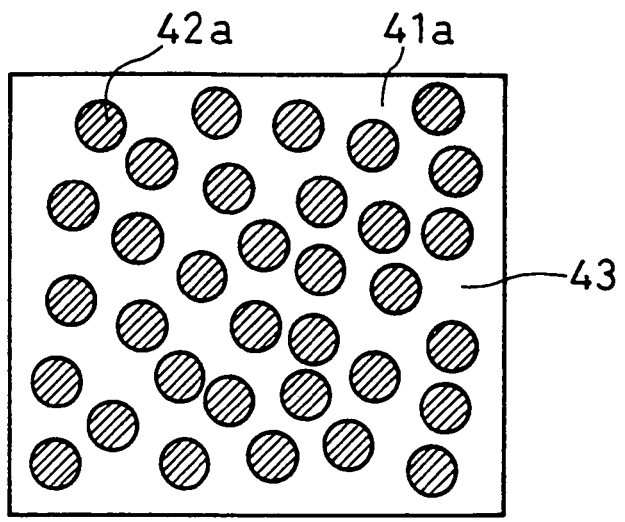
FIG. 10 is a schematic plan view showing the patterns of a light transmitting portion 41a and light intercepting portions 42a of a first photomask 43 according to Embodiment 4 of the invention.

Then, by using a first photomask 43 in which the area of light intercepting portions 42a was in a range of from 20% to 40% as circular regions as shown in FIG. 10, exposure was uniformly performed at a low illuminance as shown in FIG. 9B. In the first photomask 43, the region other than the light intercepting portions 42a is a light transmitting portion 41a. It is desirable that the exposure amount at this time is 20 mj to 100 mj. In this embodiment, exposure was performed with an exposure amount of 40 mj. At this time, the circular or polygonal light intercepting portions 42a of the first photomask 43 were randomly disposed so that the center-to-center distances between adjoining light intercepting portions 42a were in a range of from 5 μm to 50 μm, preferably, 10 μm to 20 μm. In the plan view of FIG. 10, the light intercepting portions 42a are hatched.

Figure 11:
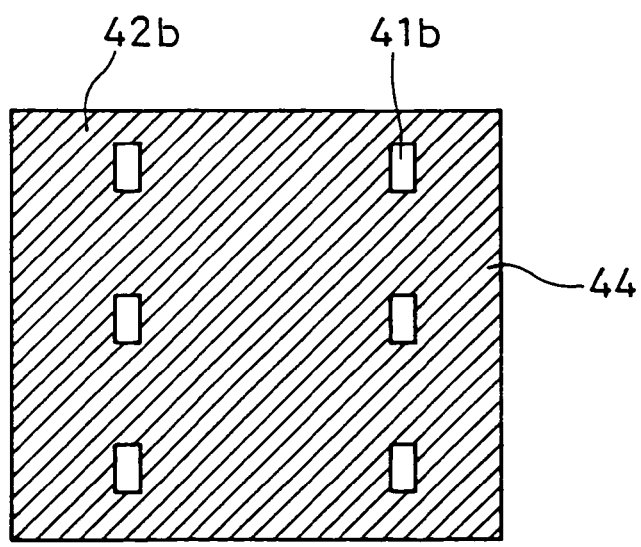
FIG. 11 is a schematic plan view showing the patterns of light transmitting portions 41b and a light intercepting portion 42b of a second photomask 44 according to Embodiment 4 of the invention.

Then, by using a second photomask 44 in which light transmitting portions 41b corresponding to the contact hole portions 30 were opened as shown in FIG. 11, the contact hole portions were uniformly exposed at a high illuminance as shown in FIG. 9C. In the second photomask 44, the region other than the light transmitting portions 41b is a light intercepting portion 42b. At this time, the second photomask 44 also serves as a light transmitting portion with respect to the signal input terminal portion 27, and the terminal portion 27 was exposed at a high illuminance simultaneously with the exposure of the contact holes. It is desirable that the exposure amount at this time is 160 mj to 500 mj. In this embodiment, exposure was performed with an exposure amount of 240 mj. In the plan view of FIG. 11, the light intercepting portion 42b is hatched.

Then, as shown in FIG. 9D, by performing development with a developing solution TMAH (tetramethylammoniumhydrooxide) manufactured by Tokyo Ohka Kogyo Co., Ltd., the resin in the part exposed at a high illuminance (the contact hole portions and the signal input terminal portion) was completely removed, approximately 40%, with respect to the initial film thickness, of the resin in the part exposed at a low illuminance was left, and approximately 80%, with respect to the initial film thickness, of the resin in the unexposed part was left.

Then, as shown in FIG. 9E, by performing a heat treatment at 200° C. for 60 minutes, the resin of the above-described condition was deformed into smooth asperities.

Then, as shown in FIG. 9F, an Al thin film was formed by sputtering as the reflecting electrode 10 on the substrate 1 in a thickness of 2000 Å, and as shown in FIGS. 9G to 9K, patterning was performed so that one reflecting electrode 10 corresponds to one transistor.

Specifically, the photoresist 28 was applied as shown in FIG. 9G, a portion to be removed for separation of each pixel electrode and the signal input terminal portion 27 were exposed as shown in FIG. 9H, and development, etching and exfoliation were performed as shown in FIGS. 9I to 9K to thereby perform patterning of the Al thin film serving as the reflecting electrode 10.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

Embodiment 5

Hereinafter, a reflective-type liquid crystal display apparatus according to Embodiment 5 of the invention will be described with reference to the drawings. The reflecting substrate 23 of the reflective-type liquid crystal display apparatus according to this embodiment is the same as the reflecting substrate 23 shown in FIG. 1 but is formed by a different manufacturing method. The manufacturing method will be described with reference to the cross-sectional views shown in FIGS. 12A to 12J.

FIGS. 12A to 12J are cross-sectional views showing a manufacturing process of the reflecting substrate 23 used in the reflective-type liquid crystal display apparatus according to Embodiment 5. In these figures, the pixel region is shown on the left side, and the signal input terminal portion region is shown on the right side.

Figure 12:
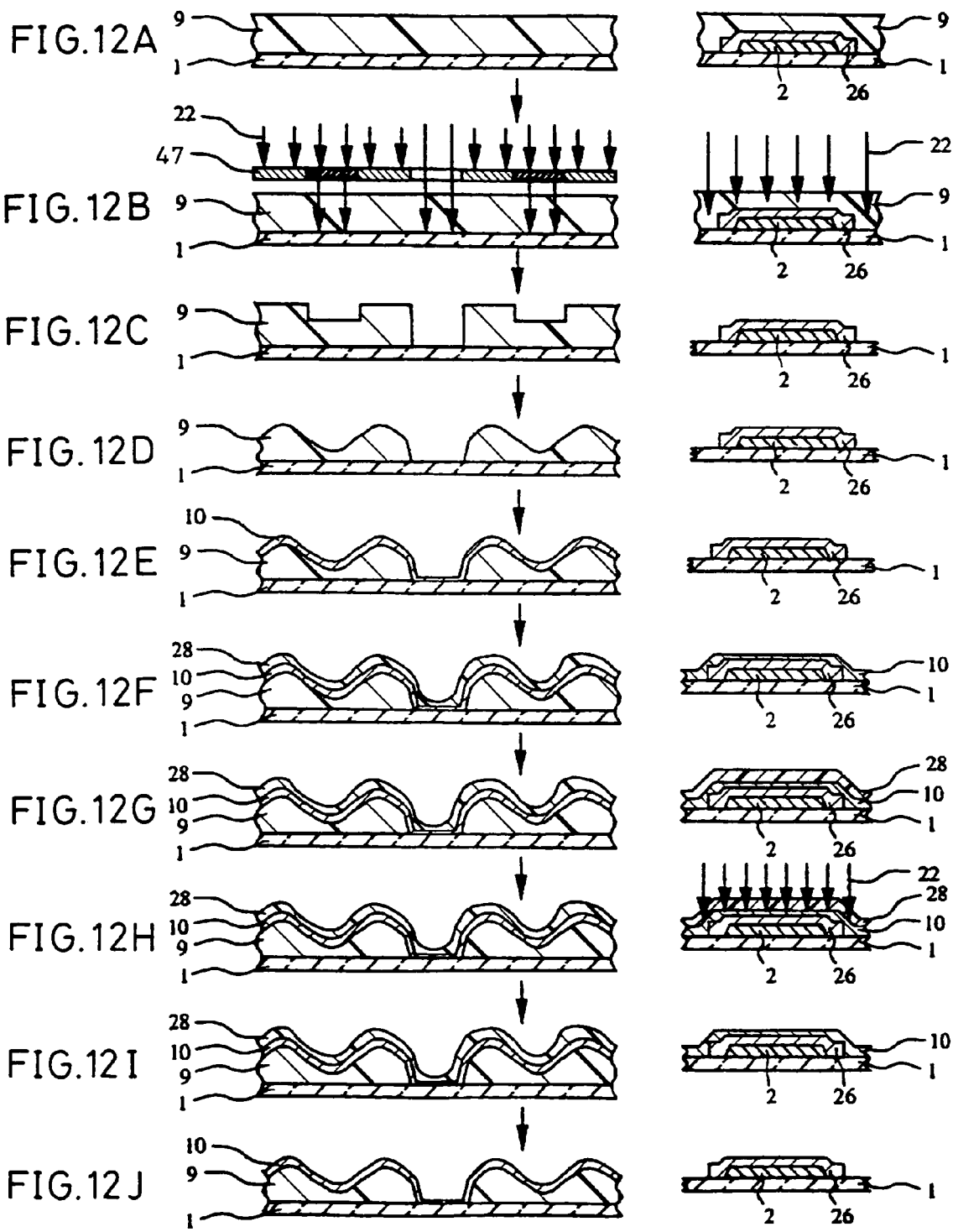
FIGS. 12A to 12J are cross-sectional views showing a manufacturing process of the reflecting substrate 23 used in the reflective-type liquid crystal display apparatus according to Embodiment 5 of the invention.

First, as shown in FIG. 12A, the positive photosensitive resin 9 (the name of the product: OFPR-800 manufactured by Tokyo Ohka Kogyo Co., Ltd.) is applied to the glass substrate 1 in a thickness of 1 to 5 μm. In this embodiment, the resin 9 was applied in a thickness of 3 μm.

Figure 13:
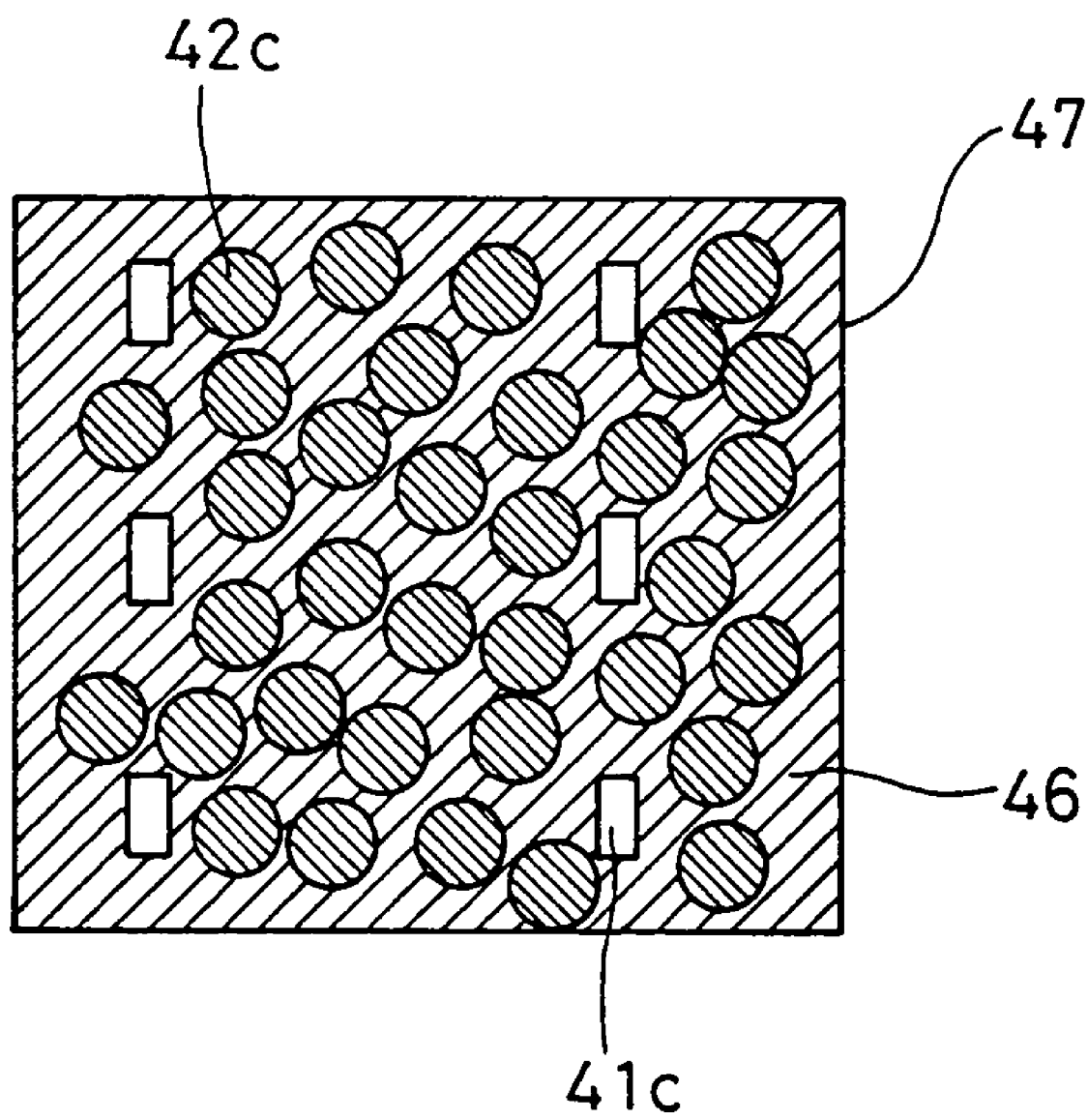
FIG. 13 is a schematic plan view showing the pattern of a photomask 47 according to Embodiment 5 of the invention.

Then, by using a photomask 47 in which light intercepting portions 42c, light transmitting portions 41c and a semi-light transmitting portion 46 coexisted and the area of the light intercepting portions 42c was in a range of from 20% to 40% as circular regions as shown in FIG. 13, exposure was uniformly performed at a high illuminance as shown in FIG. 12B. It is desirable that the exposure amount at this time is 160 mj to 500 mj. In this embodiment, exposure was performed with an exposure amount of 240 mj. At this time, the area of the circular or polygonal light intercepting portions 42c of the photomask 47 was 30%, the light intercepting portions 42c were randomly disposed so that the center-to-center distances between adjoining light intercepting portions 42c were in a range of from 5 μm to 50 μm, preferably, 10 μm to 20 μm, the light transmitting portions 41c were disposed in the regions corresponding to the contact holes 30, and the semi-light transmitting portion 46 whose light transmittance was 17% of that of the light transmitting portions was disposed in the region other than the portions 41c and 42c. Although not shown, the region other than the display region is a light transmitting region. In the plan view of FIG. 13, the semi-light transmitting portion 46 and the light intercepting portions 42c are hatched.

The succeeding process is similar to that of the above-described Embodiment 4. Development was performed as shown in FIG. 12C, and a heat treatment was performed as shown in FIG. 12D, so that smooth asperities were formed by the resin deformed.

Then, as shown in FIG. 12E, an Al thin film was formed as the reflecting electrode 10 on the substrate 1, and as shown in FIGS. 12F to 12J, patterning was performed so that one reflecting electrode 10 corresponds to one transistor.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

In the reflective-type liquid crystal display apparatus according to this embodiment, while the reflecting electrode having smooth and high-density asperities is formed like in the above-described Embodiment 1, the number of exposures can further be reduced by using the photomask having the semi-light transmitting portions in the photoprocess of the photosensitive resin, and the cost necessary for the manufacture of the reflecting substrate 23 can be reduced.

Embodiment 6

Hereinafter, a reflective-type liquid crystal display apparatus according to Embodiment 6 of the invention will be described with reference to the drawings. The reflecting substrate 23 of the reflective-type liquid crystal display apparatus according to this embodiment is the same as the reflecting substrate 23 shown in FIG. 1 but is formed by a different manufacturing method. The manufacturing method will be described with reference to the cross-sectional views shown in FIGS. 14A to 14L.

FIGS. 14A to 14L are cross-sectional views showing a manufacturing process of the reflecting substrate 23 used in the reflective-type liquid crystal display apparatus according to Embodiment 6. In these figures, the pixel region is shown on the left side, and the signal input terminal portion region is shown on the right side.

First, as shown in FIG. 14A, the positive photosensitive resin 9 (the name of the product: OFPR-800 manufactured by Tokyo Ohka Kogyo Co., Ltd.) is applied to the glass substrate 1 in a thickness of 1 to 5 μm. In this embodiment, the resin 9 was applied in a thickness of 3 μm.

Then, by using the first photomask 43 so that the area of the light intercepting portions 42a was in a range of from 20% to 40% as circular regions as shown in FIG. 10, exposure was uniformly performed at a low illuminance as shown in FIG. 14B. It is desirable that the exposure amount at this time is 20 mj to 100 mj. In this embodiment, exposure was performed with an exposure amount of 40 mj. At this time, the circular or polygonal light intercepting portions 42a of the first photomask 43 were randomly disposed so that the center-to-center distances between adjoining light intercepting portions 42a were in a range of from 5 μm to 50 μm, preferably, 10 μm to 20 μm.

Then, by using the second photomask 44 in which the light transmitting portions 41b corresponding to the contact hole portions 30 were opened as shown in FIG. 11, the contact hole portions were uniformly exposed with an exposure amount of 40 mj which was the same as that in the above-described first exposure process as shown in FIG. 14C.

Then, as shown in FIG. 14D, by performing development with a developing solution TMAH (tetramethylammonium-hydrooxide) manufactured by Tokyo Ohka Kogyo Co., Ltd., approximately 2% (0.06 μm) of the resin in the part exposed twice (the contact hole portions and the signal input terminal portion) was left, approximately 40%, with respect to the initial film thickness, of the resin in the part exposed once was left, and approximately 80%, with respect to the initial film thickness, of the resin in the unexposed part was left.

Then, as shown in FIG. 14E, by performing a heat treatment at 200° C. for 60 minutes, the resin of the above-described condition was deformed into smooth asperities.

Then, as shown in FIG. 14F, by exposing the substrate to an oxygen plasma atmosphere for five minutes in a dry etching apparatus, the outermost surface of the photosensitive resin was etched to be reduced in thickness by 0.1 μm as a whole, so that the resin in the contact hole portions and the signal input terminal portion was completely removed. This process was performed because approximately 2% of the photosensitive resin was left in the contact hole portions. However, this process is unnecessary when the resin is completely removed after the development.

The succeeding process is similar to that of the above-described Embodiments 1 to 5. As shown in FIG. 14G, an Al thin film was formed as the reflecting electrode 10 on the substrate 1, and as shown in FIGS. 14H to 14L, patterning was performed so that one reflecting electrode 10 corresponds to one transistor.

By the above-described process, the reflecting electrode 10 having smooth and high-density asperities was formed. In such a reflecting substrate 23, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the reflecting substrate 23 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the reflective-type liquid crystal display apparatus according to this embodiment.

In the reflective-type liquid crystal display apparatus according to this embodiment, while the reflecting electrode having smooth and high-density asperities is formed like in the above-described Embodiment 1, the throughput of the apparatus is enhanced by performing the first and the second exposures with the same exposure amount in the photoprocess of the photosensitive resin, and the cost necessary for the manufacture of the reflecting substrate 23 can be reduced.

Embodiment 7

Figure 15:
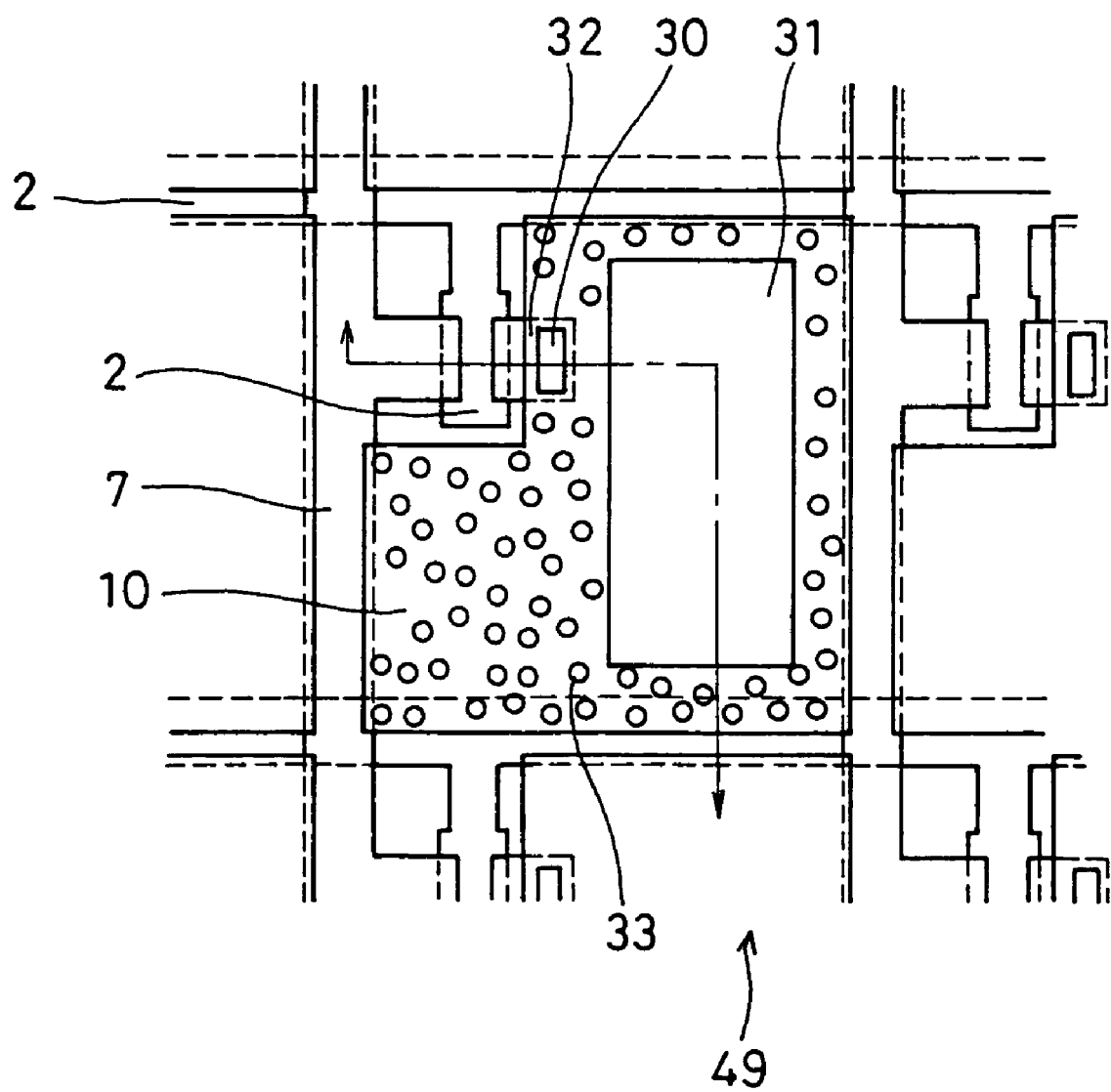
FIG. 15 is a plan view of a reflecting substrate 49 used in a transmissive/reflective type liquid crystal display apparatus according to Embodiment 7 of the invention.
Figure 16:
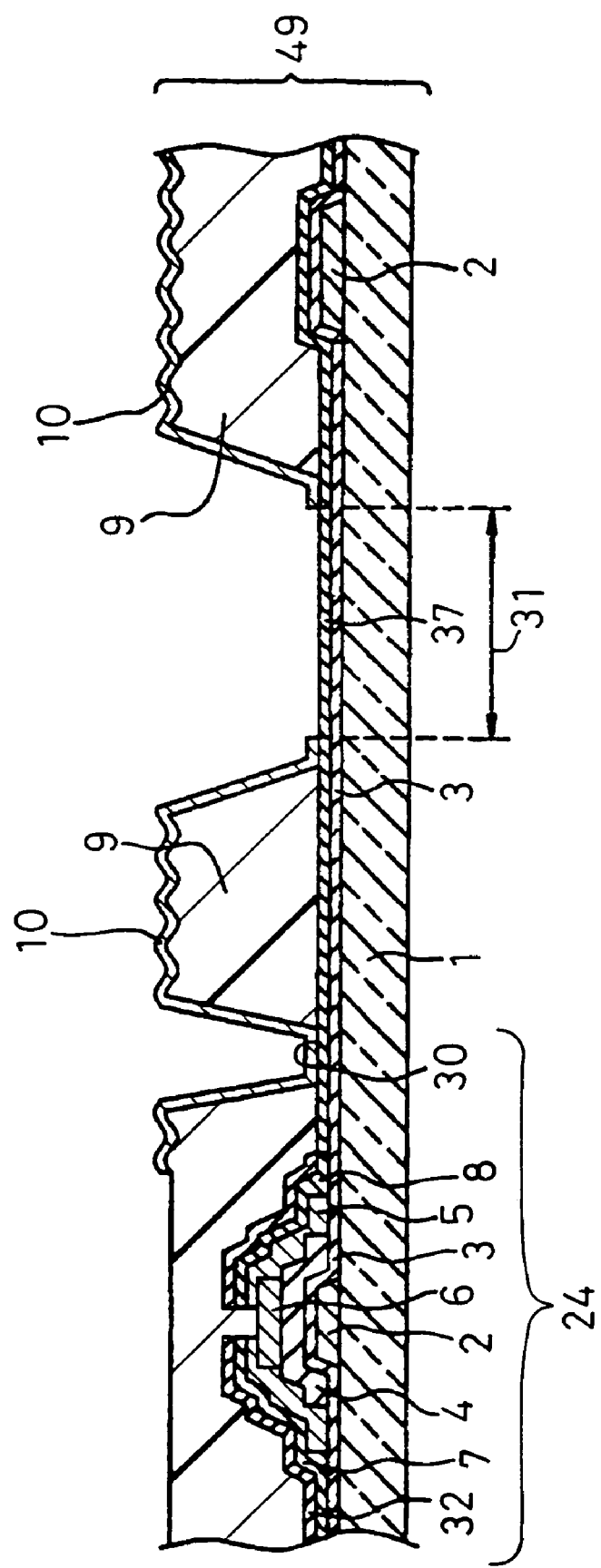
FIG. 16 is a cross-sectional view of the reflecting substrate 49 used in the transmissive/reflective type liquid crystal display apparatus according to Embodiment 7 of the invention.

Hereinafter, a transmissive/reflective type liquid crystal display apparatus according to Embodiment 7 of the invention will be described with reference to the drawings. FIG. 15 is a plan view showing a substrate 49 of the transmissive/reflective type liquid crystal display apparatus according to this embodiment. FIG. 16 is a cross-sectional view of the substrate 49 shown in FIG. 15. FIGS. 17A to 17F are cross-sectional views showing the flow of the manufacturing process of the substrate 49.

As shown in FIGS. 15 and 16, in the substrate 49 used in the transmissive/reflective type liquid crystal display apparatus according to this embodiment, one pixel electrode formed on the substrate 49 is divided into a reflecting region in which the reflecting electrode 10 is formed and a transmitting region 31 in which a transparent electrode 37 is formed. The reflecting electrode 10 has on the surface thereof smooth and high-density asperities comprising the circular concave or convex portions 33 like in Embodiments 1 to 6.

With this structure, the transmissive/reflective type liquid crystal display apparatus according to this embodiment can be used as a reflective-type liquid crystal display apparatus when the ambient light is so strong that the display is dimmed in a transmissive liquid crystal display apparatus, and can be used as a transmissive liquid crystal display apparatus by turning on the backlight when the display cannot be clearly viewed in the reflective-type liquid crystal display apparatus because of a dim environment.

In the transmissive/reflective type liquid crystal display apparatus according to this embodiment, as shown in FIGS. 15 and 16, an amorphous silicon transistor is formed on the glass substrate 1 as the liquid crystal driving device 24. The liquid crystal driving device 24 comprises Ta as the gate electrode 2 on the glass substrate 1, SiNx as the gate insulating layer 3, a-Si as the semiconductor layer 4, n-type a-Si as the n-type semiconductor layer 5, the source electrode 7 and the drain electrode 8 made of ITO, and a Ta layer 32 formed on the electrodes 7 and 8. The ITO of the drain electrode 8 is extended to the pixel region to form the transparent electrode 37 formed in the transmitting region.

Although not shown in this embodiment, the signal input terminal portion 27 for inputting signals to the gate bus line and the source bus line is similar to those of the above-described Embodiments 1 to 6.

A manufacturing process of the substrate 49 of the transmissive/reflective type liquid crystal display apparatus according to this embodiment will be described with reference to FIGS. 17A to 17F. In FIGS. 17A to 17F, the ITO being present in the transmitting region 31 is omitted.

Figure 17A:
FIGS. 17A to 17F are cross-sectional views showing a manufacturing process of the reflecting substrate 49 used in the transmissive/reflective type liquid crystal display apparatus according to Embodiment 7 of the invention.

First, as shown in FIG. 17A, the negative photosensitive resin 9 (the name of the product: OFPR-800 manufactured by Tokyo Ohka Kogyo Co., Ltd.) is applied to the glass substrate 1 in a thickness of 1 to 5 Am. In this embodiment, the resin 9 was applied in a thickness of 3 μm.

Figure 17B:
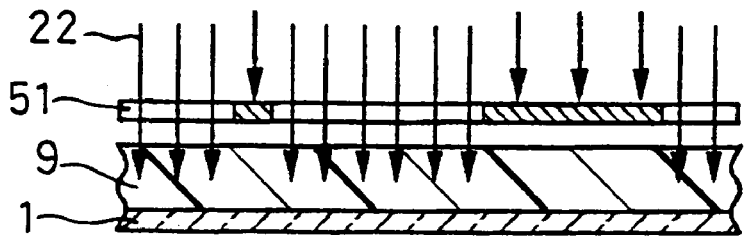
Figure 18:
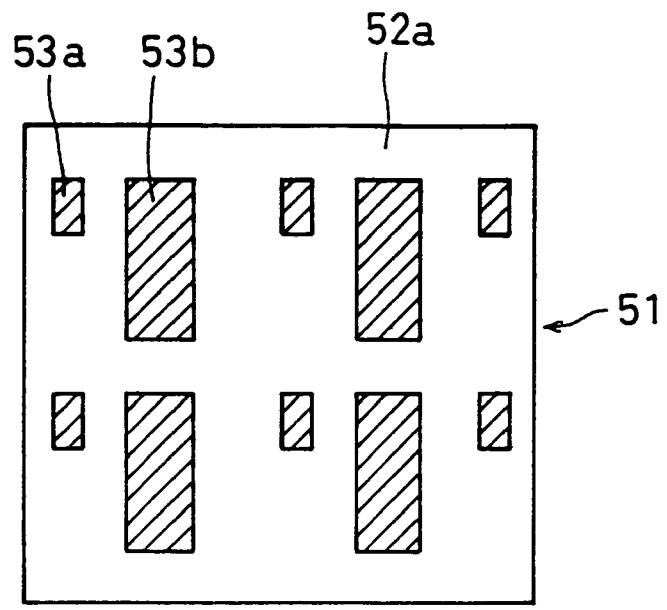
FIG. 18 is a schematic plan view showing the patterns of a light transmitting portion 52a and light intercepting portions 53a and 53b of a first photomask 51 according to Embodiment 7 of the invention.

Then, by using a first photomask 51 in which light intercepting portions 53a and 53b corresponding to the contact hole portions 30 and the transmitting region 31 were disposed as shown in FIG. 18, the contact hole portions 30 and the transmitting region 31 were uniformly exposed at a low illuminance as shown in FIG. 17B. In the first photomask 51, the region other than the light intercepting portions 53a and 53b is a light transmitting portion 52a. It is desirable that the exposure amount at this time is 20 mj to 100 mj. In this embodiment, exposure was performed with an exposure amount of 40 mj. In the plan view of FIG. 18, the light intercepting portions 53a and 53b are hatched.

Figure 17C:
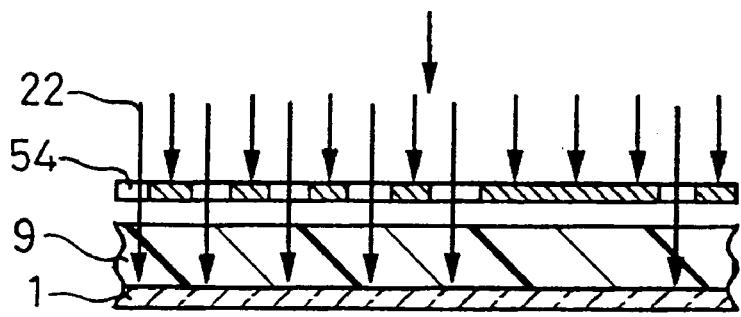
Figure 19:
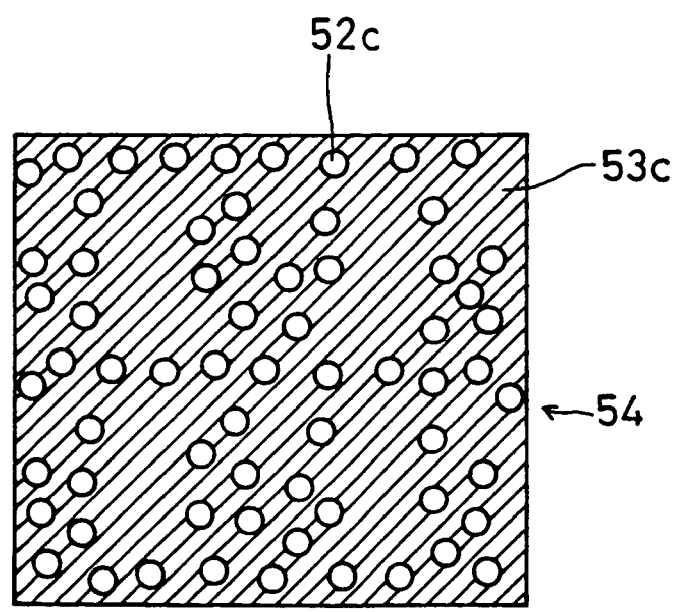
FIG. 19 is a schematic plan view showing the patterns of light transmitting portions 52c and a light intercepting portion 53c of a second photomask 54 according to Embodiment 7 of the invention.

Then, by using a second photomask 54 in which light transmitting portions 52c were disposed so as not to be present in the contact hole portions 30 and the transmitting region 31 as circular regions as shown in FIG. 19, exposure was uniformly performed at a high illuminance as shown in FIG. 17C. In the second photomask 54, the region other than the light transmitting portions 52c is a light intercepting portion 53c. It is desirable that the exposure amount at this time is 160 mj to 500 mj. In this embodiment, exposure was performed with an exposure amount of 240 mj using the second photomask 54 in which the area of the light transmitting portions 52c was 30%. At this time, the area of the circular or polygonal light transmitting portions 52c of the second photomask 54 was 30% of the area of the reflecting electrode and the light transmitting portions 52c were randomly disposed so that the center-to-center distances between adjoining light transmitting portions 52c were in a range of from 5 µm to 50 µm, preferably, 10 µm to 20 µm. Moreover, at this time, the first and the second photomasks 51 and 54 were structured so as to intercept the signal input terminal portion 27 from light as well as the contact hole portions. In the plan view of FIG. 19, the light intercepting portion 53c is hatched.

Figure 17D:
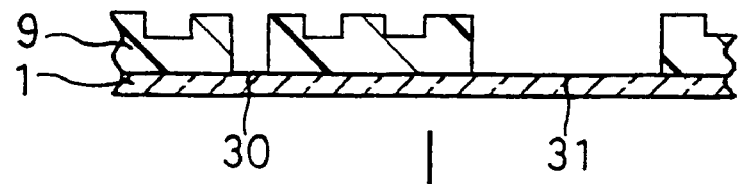

Then, as shown in FIG. 17D, by performing development with a developing solution TMAH (tetramethylammoniumhydrooxide) manufactured by Tokyo Ohka Kogyo Co., Ltd., the resin in the exposed part (the contact hole portions, the transmitting region and the signal input terminal portion) was completely removed, approximately 40%, with respect to the initial film thickness, of the resin in the part exposed at a low illuminance was left, and approximately 80%, with respect to the initial film thickness, of the resin in the unexposed part was left.

Figure 17E:
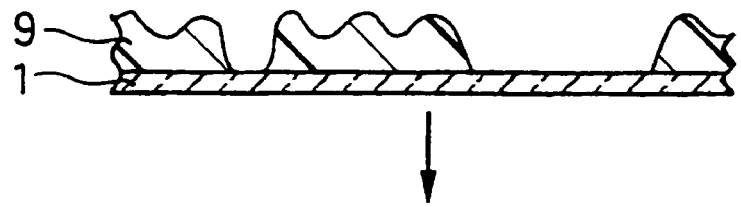

Then, as shown in FIG. 17E, by performing a heat treatment at 200° C. for 60 minutes, the resin of the above-described condition was deformed into smooth asperities.

Figure 17F:
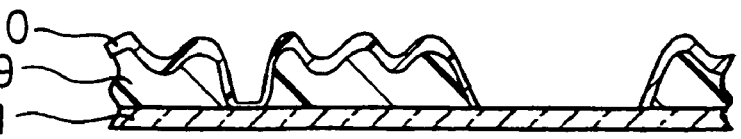

The succeeding process is similar to that of the above-described Embodiments 1 to 6. As shown in FIG. 17F, an Al thin film was formed as the reflecting electrode 10 on the substrate 1, and patterning was performed so that one reflecting electrode 10 corresponds to one transistor.

By the above-described process, the substrate 49 having the reflecting region comprising the reflecting electrode 10 having smooth and high-density asperities, and the transmitting region 31 comprising the transparent electrode 37 was formed. In the reflecting electrode on the substrate 49, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the substrate 49 and a color filter substrate for supporting a transparent electrode are bonded together with a spacer therebetween in a manner similar to that of the prior art, liquid crystal is filled, a phase difference plate and a polarizing plate are bonded to the color filter substrate and a backlight is set on the back surface of the substrate 49 to complete the transmissive/reflective type liquid crystal display apparatus according to this embodiment.

Embodiment 8

A manufacturing process of the substrate 49 of a transmissive/reflective type liquid crystal display apparatus according to Embodiment 8 of the invention will be described with reference to FIGS. 20A to 20F.

The substrate of the transmissive/reflective type liquid crystal display apparatus according to this embodiment is the same as the substrate 49 shown in FIG. 15 but is formed by a different manufacturing method. The manufacturing method will be described with reference to the cross-sectional views shown in FIGS. 20A to 20F.

Figure 20A:
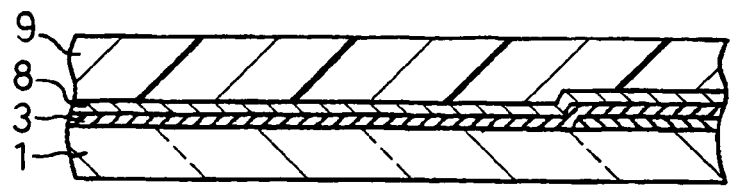
FIGS. 20A to 20F are cross-sectional views showing a manufacturing process of the reflecting substrate 49 used in a transmissive/reflective type liquid crystal display apparatus according to Embodiment 8 of the invention.

First, as shown in FIG. 20A, the positive photosensitive resin 9 (the name of the product: OFPR-800 manufactured by Tokyo Ohka Kogyo Co., Ltd.) is applied to the glass substrate 1 in a thickness of 1 to 5 µm. In this embodiment, the resin 9 was applied in a thickness of 3 µm.

Figure 20B:
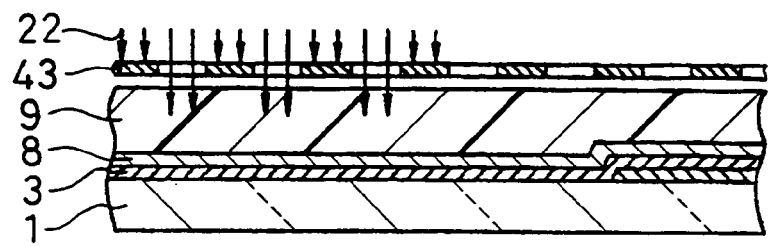

Then, by using the first photomask 43 in which the area of the light intercepting portions 42a was in a range of from 20% to 40% as circular regions as shown in FIG. 10, exposure was uniformly performed at a low illuminance as shown in FIG. 20B. It is desirable that the exposure amount at this time is 20 mj to 100 mj. In this embodiment, exposure was performed with an exposure amount of 40 mj using the first photomask 43 in which the area of the light intercepting portions 42a was 30%. At this time, the circular or polygonal light intercepting portions 42a of the first photomask 43 were randomly disposed so that the center-to-center distances between adjoining light intercepting portions 42a were in a range of from 5 µm to 50 µm, preferably, 10 µm to 20 µm.

Figure 20C:
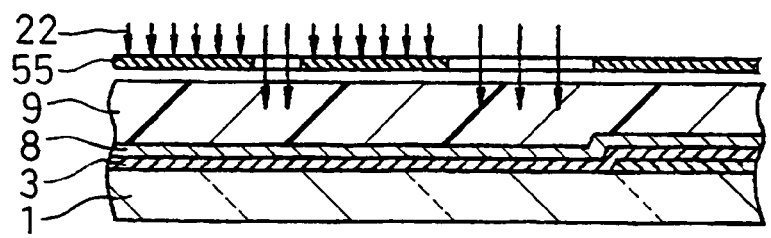
Figure 21:
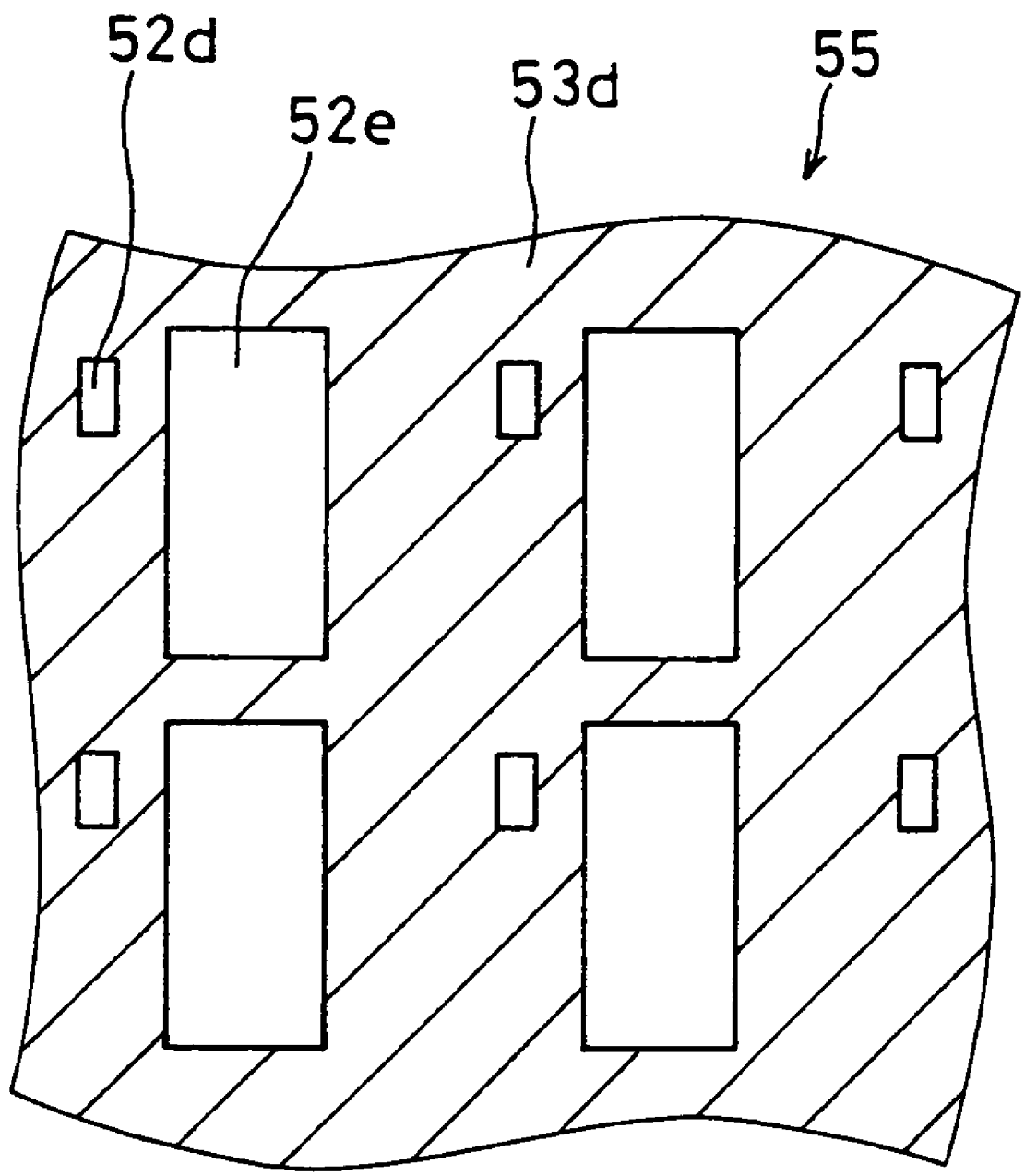
FIG. 21 is a schematic plan view showing the patterns of light transmitting portions 52d and 52e and a light intercepting portion 53d of a second photomask 55 according to Embodiment 8 of the invention.
Figure 22:
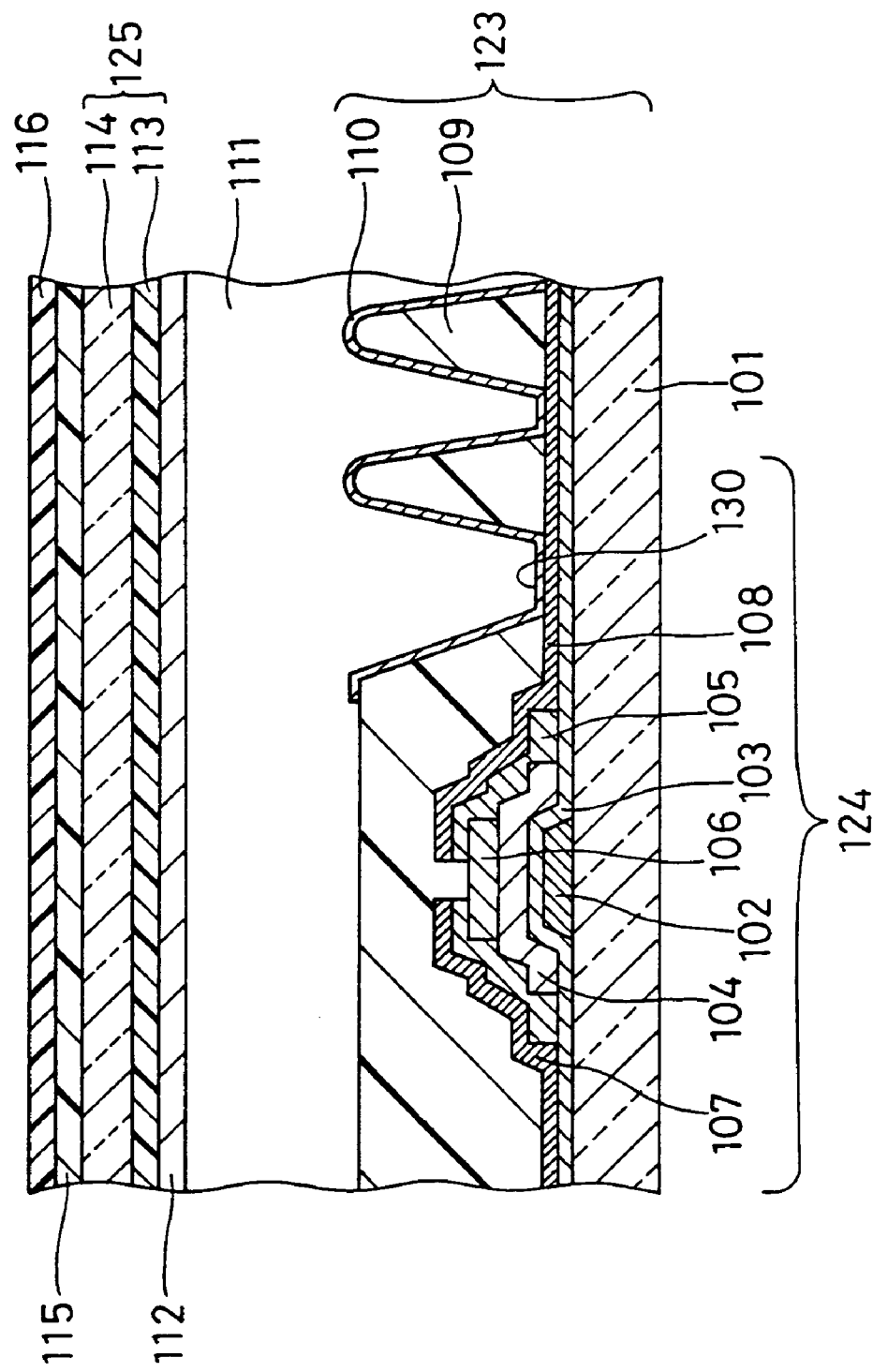
FIG. 22 is a plan view illustrating a conventional mask used in making a reflective LCD.

Then, by using a second photomask 55 in which light transmitting portions 52d and 52e corresponding to the contact hole portions 30 and the transmitting region 31 were opened as shown in FIG. 21, the contact hole portions 30 and the transmitting region 31 were uniformly exposed at a high illuminance as shown in FIG. 20C. In the second photomask 55, the region other than the light transmitting portions 52d and 52e is a light intercepting portion 53d. At this time, the second photomask 55 had a light transmitting portion with respect to the signal input terminal portion 27, and the terminal portion 27 was exposed at a high illuminance simultaneously with the exposure of the contact holes and the transmitting portion. It is desirable that the exposure amount at this time is 160 mj to 500 mj. In this embodiment, exposure was performed with an exposure amount of 240 mj. In the plan view of FIG. 21, the light intercepting portion 53d is hatched.

Figure 20D:
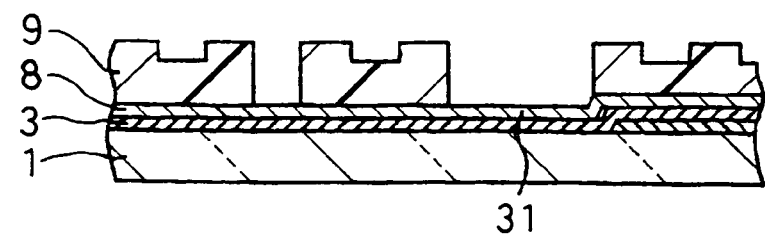

Then, as shown in FIG. 20D, by performing development with a developing solution TMAH (tetramethylammoniumhydrooxide) manufactured by Tokyo Ohka Kogyo Co., Ltd., the resin in the exposed part (the contact hole portions, the transmitting region and the signal input terminal portion) was completely removed, approximately 40%, with respect to the initial film thickness, of the resin in the part exposed at a low illuminance was left, and approximately 80%, with respect to the initial film thickness, of the resin in the unexposed part was left.

Figure 20E:
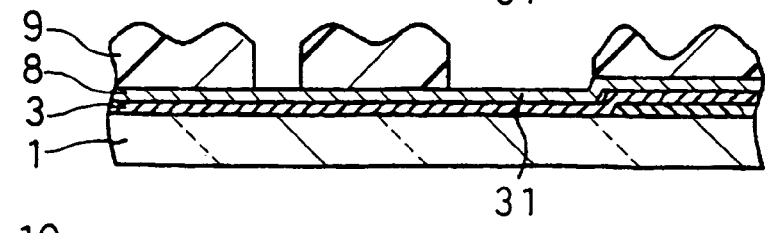

Then, as shown in FIG. 20E, by performing a heat treatment at 200° C. for 60 minutes, the resin of the above-described condition was deformed into smooth asperities.

Figure 20F:
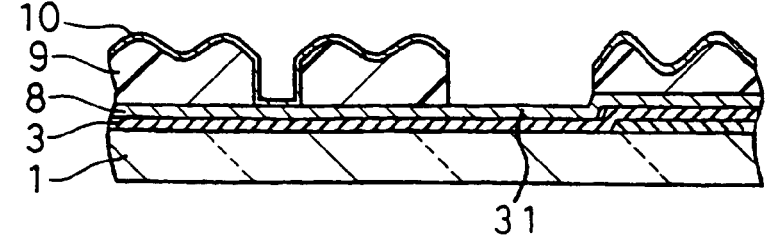

The succeeding process is similar to that of the above-described Embodiments 1 to 7. As shown in FIG. 20F, an Al thin film was formed as the reflecting electrode 10 on the substrate 1, and patterning was performed so that one reflecting electrode 10 corresponds to one transistor.

By the above-described process, the substrate 49 was formed that had the reflecting region comprising the reflecting electrode 10 having smooth and high-density asperities, and the transmitting region 31 comprising the transparent electrode 37. In the reflecting electrode on the substrate 49, the area of the flat part is reduced, so that ideal reflection characteristics with a small regular reflection component can be realized. Moreover, the number of photoprocesses of the photosensitive resin can be reduced, so that the cost necessary for the manufacture of the reflecting plate can be reduced.

Lastly, the substrate 49 and a color filter substrate for supporting a transparent electrode are bonded together with a spacer therebetween in a manner similar to that of the prior art, liquid crystal is filled, and a phase difference plate and a polarizing plate are bonded to the color filter substrate to complete the transmissive/reflective type liquid crystal display apparatus according to this embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for fabricating a reflection type liquid crystal display, comprising steps of:
   forming a switching element having a source, a drain, and a gate on an insulation substrate;
   depositing a photosensitive organic insulation film to a first thickness onto the insulation substrate;
   performing a first exposure using a first mask such that the photosensitive organic insulation film on a portion proximate the drain is completely exposed;
   performing a second exposure using a second mask such that the photosensitive organic insulation film is exposed to a depth shallower than that of the first exposure;
   developing and removing the first exposed portion and the second exposed portion;
   heating the photosensitive organic insulation film; and
   forming a reflection electrode onto a selected portion of the photosensitive organic insulation film.

2. The method of claim 1, wherein the first and second exposures comprises different exposure amounts.

3. A method of making a reflective liquid crystal display, the method comprising:
   providing a substrate;
   applying a photosensitive resin on the substrate;
   using a single photomask to form both a) asperities in a first region of the photosensitive resin which do not extend all the way through the photosensitive resin, and b) contact holes in a second region of the photosensitive resin, said contact holes extending all the way through the photosensitive resin;
   providing said photomask with light transmitting portions, light intercepting portions, and semi-light transmitting portions, so that different amounts of light exposure are utilized using said photomask in order to form at least one of said asperities and said contact holes;
   developing the exposed photosensitive resin;
   heat treating the developed photosensitive resin; and
   forming a reflective electrode on the heat treated photosensitive resin so that said reflective electrode is in electrical communication with a switching element through at least one of said contact holes.

4. The method of claim 3, wherein the photosensitive resin is negative, and said exposure includes exposing the photosensitive resin using said photomask when the light transmitting portions and semi-light transmitting portions of the mask are located over said first region of said photosensitive resin, and the light intercepting portions of said photomask are located over said second region of said photosensitive resin.

5. The method of claim 3, wherein the photosensitive resin is positive, and said exposure includes exposing the photosensitive resin using said photomask when said light intercepting portions and said semi-light transmitting portions of said photomask are located over said first region of said photosensitive resin, and said light transmitting portion of said photomask is located over said second region of said photosensitive resin.

6. A method of making a reflective liquid crystal display, the method comprising:
   applying a photosensitive resin to a substrate;
   forming asperities which do not extend all the way through the resin in a first region of the photosensitive resin by using a first photomask and exposing at least part of the first region using said first photomask;
   forming contact holes in a second region of the photosensitive resin using a second photomask different than the first photomask, and exposing at least part of the second region using said second photomask;
   developing the exposed photosensitive resin;
   heat treating the developed photosensitive resin;
   forming a reflective electrode on the heat treated photosensitive resin over asperities so that said reflective electrode is in communication with at least one switching element through at least one of the contact holes; and
   wherein exposure amounts using the first and second photomasks are the same.

7. The method of claim 6, wherein the photosensitive resin comprises a positive photosensitive resin, and the method further comprises removing the photosensitive resin when it is left in the second region after the developing.

8. A method of manufacturing a liquid crystal display apparatus having, on one of a pair of substrates disposed so as to be opposed with a liquid crystal layer therebetween, a reflecting film for reflecting incident light from the other substrate, comprising:
   applying a photosensitive resin on said one of the substrates;
   in order to form asperities in a first region of the applied photosensitive resin film which do not extend all the way through the photosensitive resin and to form a contact hole in a second region of the applied photosensitive resin film, exposing at least part of the first region with various integrals of exposure amounts using a first photomask so that the photosensitive resin in the first region is left in respective different film thicknesses, and exposing at least part of the second region with an integral of exposure amount different from those for the first region using a second photomask, wherein each of said first and second photomasks comprise both light transmitting portions for transmitting illuminance and light intercepting portions for blocking illuminance from reaching the photosensitive resin so that the asperities and contact hole are formed based upon arrangement of the light transmitting portions and light intercepting portions in the photomasks;
   developing the exposed photosensitive resin;
   heat-treating the developed photosensitive resin; and
   forming a reflecting film on the heat-treated photosensitive resin so that the reflecting film is in electrical communication with a switching element through said contact hole.

9. The method of manufacturing a liquid crystal display apparatus of claim 8, wherein uniform and low-illuminance exposure is performed exposing the photosensitive resin using one of the first photomask and the second photomask, while uniform and high-illuminance exposure is performed at the step of exposing the photosensitive resin using the other of the first photomask and the second photomask.

10. The method of manufacturing a liquid crystal display apparatus of claim 9, wherein circular or polygonal regions are irregularly disposed in the first or second photomask and that the total area of the circular or polygonal regions is in a range of from 20% to 40% of the total area of the photomask.

11. The method of manufacturing a liquid crystal display apparatus of claim 10, wherein the circular or polygonal regions disposed in the first or second photomask are irregularly disposed so that the center-to-center distances between adjoining regions are in a range of from 5 μm to 50 μm.

12. A method of making a reflective liquid crystal display, the method comprising:
    applying a photosensitive resin to a substrate;
    forming asperities which do not extend all the way through the resin in a first region of the photosensitive resin by using a first photomask and exposing at least part of the first region using said first photomask;
    forming contact holes in a second region of the photosensitive resin using a second photomask different than the first photomask, and exposing at least part of the second region using said second photomask;
    developing the exposed photosensitive resin;
    heat treating the developed photosensitive resin;
    forming a reflective electrode on the heat treated photosensitive resin over asperities so that said reflective electrode is in communication with at least one switching element through at least one of the contact holes; and
    wherein each of said first and second photomasks comprise both light transmitting portions for transmitting illuminance and light intercepting portions for blocking illuminance from reaching the photosensitive resin so that the asperities and contact hole are formed based upon arrangement of the light transmitting portions and light intercepting portions in the photomasks.

13. The method of claim 12, wherein uniform and low-illuminance exposure is performed so as to expose the photosensitive resin using the first photomask, while uniform and higher illuminance exposure is performed so as to expose the photosensitive resin using the second photomask.

14. The method of claim 12, wherein the photosensitive resin comprises a positive photosensitive resin, and the method further comprises removing the photosensitive resin when it is left in the second region after the developing.

15. The method of claim 12, wherein uniform and low-illuminance exposure is performed so as to expose the photosensitive resin using the second photomask, while uniform and higher illuminance exposure is performed so as to expose the photosensitive resin using the first photomask.

16. A method for fabricating a reflection type liquid crystal display, comprising steps of:
    forming a switching element having a source, a drain, and a gate on an insulation substrate;
    depositing a photosensitive insulation film to a first thickness on the insulation substrate;
    performing a first exposure using a first mask including a light blocking portion and a light transmitting portion such that a first portion of the photosensitive insulation film is exposed for forming a contact hole proximate the drain;
    performing a second exposure using a second mask including a light blocking portion and a light transmitting portion such that a second portion of the photosensitive insulation film is exposed to a lesser amount of radiation than was the first portion in the first exposure;
    developing and removing the first exposed portion and the second exposed portion of the photosensitive insulation film;
    heating the photosensitive insulation film; and
    forming a reflection electrode on a selected portion of the photosensitive insulation film.

17. The method of claim 16, wherein the photosensitive insulation film is organic.

18. The method of claim 16, wherein circular or polygonal shaped regions are randomly disposed in the second mask.

19. The method of claim 16, wherein the second mask has adjoining circular or polygonal shaped regions and the center-to-center distances between the adjoining circular or polygonal shaped regions is from 5 to 50 μm.

20. The method of claim 16, wherein the second mask has adjoining circular or polygonal shaped regions and the total area of the circular or polygonal shaped regions in the second mask is more than 20% of the total area of the second mask.

21. The method of claim 20, wherein the thickness of the photosensitive resin is 3 μm.

22. The method of claim 16, wherein the second mask has adjoining circular or polygonal shaped regions and the total area of the circular or polygonal shaped regions in the second mask is less than 40% of the total area of the second mask.

23. The method of claim 22, wherein the thickness of the photosensitive resin is 3 μm.

24. The method of claim 16, wherein the second mask has adjoining circular or polygonal shaped regions and the total area of the circular or polygonal shaped regions in the second mask is from 20% to 40% of the total area of the second mask.

25. The method of claim 24, wherein the thickness of the photosensitive resin is 3 μm.

26. The method of claim 16, wherein the second mask has adjoining circular or polygonal shaped regions and the total area of the circular or polygonal shaped regions in the second mask is less than 40% and more than 20% of the total area of the second mask.

27. The method of claim 16, wherein the second mask has adjoining circular or polygonal shaped regions and the total area of the circular or polygonal shaped regions in the second mask is 30% of the total area of the second mask.

28. The method of claim 27, wherein the thickness of the photosensitive resin is 3 μm.

29. The method of claim 16, wherein the thickness of the photosensitive resin is from 1 to 5 μm.

30. The method of claim 16, wherein the photosensitive resin is a negative photosensitive resin, and wherein the lesser amount of radiation is an exposure amount such that cross-linking of the photosensitive resin does not sufficiently progress in the negative photosensitive resin and resin remaining after said developing is more than 0% and less than 50% of the thickness of the resin before said developing.

31. The method of claim 16, wherein the photosensitive resin is a negative photosensitive resin, and wherein the lesser amount of radiation is an exposure amount such that cross-linking of the photosensitive resin does not sufficiently progress in the negative photosensitive resin and resin remaining after said developing is at least 10% and less than 50% of the thickness of the resin before said developing.

32. The method of claim 16, wherein the photosensitive resin is a positive photosensitive resin, and wherein the lesser amount of radiation is an exposure amount such that solubilization of a sensitizer that that restrains dissolution of the resin in developing solution used in said developing is not sufficiently performed in the positive photosensitive resin and resin remaining after said developing is 0% or more and less than 50% of the thickness of the resin before said developing.

33. The method of claim 16, wherein the photosensitive resin is a positive photosensitive resin, and wherein the lesser amount of radiation is an exposure amount such that solubilization of a sensitizer that that restrains dissolution of the resin in developing solution used in said developing is not sufficiently performed in the positive photosensitive resin and resin remaining after said developing is from 10% to 50% of the thickness of the resin before said developing.

34. A method for fabricating a liquid crystal display, the method comprising:
    forming a transistor comprising a source, a drain, and a gate on a substrate;
    depositing a photosensitive insulation film on the substrate;
    performing a first exposure using a first mask including a light blocking portion and a light transmitting portion such that a first portion of the photosensitive insulation film is exposed for forming a contact hole proximate the drain;
    performing a second exposure using a second mask including a light blocking portion and a light transmitting portion such that a second portion of the photosensitive insulation film is exposed to a lesser amount of radiation than was the first portion in the first exposure;
    developing and removing the first exposed portion and the second exposed portion of the photosensitive insulation film;
    heating the photosensitive insulation film; and
    forming a reflection electrode on a selected portion of the photosensitive insulation film on the substrate.

35. The method of claim 34, wherein the photosensitive insulation film is organic.

36. The method of claim 34, wherein circular or polygonal shaped regions are randomly disposed in the second mask.

37. The method of claim 34, wherein the second mask has adjoining circular or polygonal shaped regions and the center-to-center distances between the adjoining circular or polygonal shaped regions is from 5 to 50 μm.

38. The method of claim 34, wherein the second mask has adjoining circular or polygonal shaped regions and the total area of the circular or polygonal shaped regions in the second mask is more than 20% of the total area of the second mask.

39. The method of claim 38, wherein the thickness of the photosensitive resin is 3 μm.

40. The method of claim 34, wherein the second mask has adjoining circular or polygonal shaped regions and the total area of the circular or polygonal shaped regions in the second mask is less than 40% of the total area of the second mask.

41. The method of claim 40, wherein the thickness of the photosensitive resin is 3 μm.

42. The method of claim 34, wherein the second mask has adjoining circular or polygonal shaped regions and the total area of the circular or polygonal shaped regions in the second mask is from 20% to 40% of the total area of the second mask.

43. The method of claim 42, wherein the thickness of the photosensitive resin is 3 μm.

44. The method of claim 34, wherein the second mask has adjoining circular or polygonal shaped regions and the total area of the circular or polygonal shaped regions in the second mask is less than 40% and more than 20% of the total area of the second mask.

45. The method of claim 34, wherein the second mask has adjoining circular or polygonal shaped regions and the total area of the circular or polygonal shaped regions in the second mask is 30% of the total area of the second mask.

46. The method of claim 45, wherein the thickness of the photosensitive resin is 3 μm.

47. The method of claim 34, wherein the thickness of the photosensitive resin is from 1 to 5 μm.

48. The method of claim 34, wherein the photosensitive resin is a negative photosensitive resin, and wherein the lesser amount of radiation is an exposure amount such that cross-linking of the negative photosensitive resin does not sufficiently progress and resin remaining after said developing is more than 0% and less than 50% of the thickness of the negative photosensitive resin before said developing.

49. The method of claim 34, wherein the photosensitive resin is a negative photosensitive resin, and wherein the lesser amount of radiation is an exposure amount such that cross-linking of the negative photosensitive resin does not sufficiently progress so that resin remaining after said developing is at least 10% and less than 50% of the thickness of the negative photosensitive resin before said developing.

50. The method of claim 34, wherein the photosensitive resin is a positive photosensitive resin, and wherein the lesser amount of radiation is an exposure amount such that solubilization of a sensitizer that that restrains dissolution of the positive photosensitive resin in developing solution used in said developing is not sufficiently performed so that resin remaining after said developing is 0% or more and less than 50% of the thickness of the positive photosensitive resin before said developing.

51. The method of claim 34, wherein the photosensitive resin is a positive photosensitive resin, and wherein the lesser amount of radiation is an exposure amount such that solubilization of a sensitizer that that restrains dissolution of the positive photosensitive resin in developing solution used in said developing is not sufficiently performed so that resin remaining after said developing is from 10% to 50% of the thickness of the positive photosensitive resin before said developing.

52. A method for fabricating a liquid crystal display, the method comprising:
    depositing a photosensitive insulation film on a substrate;
    as part of forming a contact hole which extends all the way through the photosensitive insulation film, exposing part of the photosensitive insulation film using a first mask including a light blocking portion and a light transmitting portion;
    as part of forming asperities in a surface of the photosensitive insulation film which do not extend all the way through the photosensitive insulation film, exposing part of the photosensitive insulation film using a second mask including a light blocking portion and a light transmitting portion, wherein exposures using the first mask and the second mask, respectively, are of different exposure amounts;

developing and removing parts of the photosensitive insulation film so as to form at least the contact hole and the asperities in the photosensitive insulation film;

heating the photosensitive insulation film; and forming a reflection electrode on a selected portion of the photosensitive insulation film on the substrate, so that the reflection electrode is located over at least some of the asperities and is in electrical communication with the transistor via the contact hole.

53. The method of claim 52, wherein the photosensitive insulation film comprises a positive photosensitive resin.

54. The method of claim 52, wherein the photosensitive insulation film comprises a negative photosensitive resin.

55. The method of claim 52, wherein the first mask includes a plurality of light blocking portions.

56. The method of claim 52, wherein the first mask includes a plurality of light transmitting portions.

57. The method of claim 52, wherein the first and second masks are used to form a plurality of contact holes and a plurality of asperities in the photosensitive insulation film.

58. The method of claim 52, wherein the first exposure provides an exposure amount of from 20 mj to 100 mj, and wherein the second exposure provides an exposure amount of from 160 mj to 500 mj.

59. The method of claim 52, wherein the steps are performed in the order in which they are recited.

60. The method of claim 52, wherein center-to-center distances between adjoining light transmitting portions of the second mask are in a range of from 5 to 50 μm.

61. The method of claim 52, wherein the display comprises a transmissive/reflective liquid crystal display.

62. The method of claim 52, wherein the exposure using the second mask is performed prior to the exposure using the first mask.

63. The method of claim 52, wherein the photosensitive insulation film is organic.

64. The method of claim 52, wherein the second mask has adjoining light blocking portions, and wherein the center-to-center distances between the adjoining light blocking portions is from 5 to 50 μm.

65. The method of claim 52, wherein the second mask has adjoining circular or polygonal shaped regions and the total area of the circular or polygonal shaped regions in the second mask is more than 20% of the total area of the second mask.

66. The method of claim 52, wherein the second mask has adjoining circular or polygonal shaped regions and the total area of the circular or polygonal shaped regions in the second mask is less than 40% of the total area of the second mask.

67. The method of claim 52, wherein the second mask has adjoining circular or polygonal shaped regions and the total area of the circular or polygonal shaped regions in the second mask is from 20% to 40% of the total area of the second mask.

68. The method of claim 52, wherein the second mask has adjoining circular or polygonal shaped regions and the total area of the circular or polygonal shaped regions in the second mask is 30% of the total area of the second mask.

69. A method for fabricating a liquid crystal display, the method comprising:

depositing a photosensitive insulation film on a substrate;

as part of forming at least one contact hole which extends all the way through the photosensitive insulation film, exposing part of the photosensitive insulation film using a first mask including a light blocking portion and a light transmitting portion;

as part of forming asperities in the photosensitive insulation film which do not extend all the way through the photosensitive insulation film, exposing part of the photosensitive insulation film using a second mask including a light blocking portion and a light transmitting portion, wherein exposures using the first mask and the second mask, respectively, are of different exposure amounts;

developing and removing parts of the photosensitive insulation film so as to form the at least one contact hole which extends all the way through the photosensitive insulation film as well as the asperities; and forming at least a first reflection electrode on a selected portion of the photosensitive insulation film, so that the first reflection electrode is located over at least some of the asperities and is in electrical communication with a transistor via one of the at least one contact hole.

70. The method of claim 69, wherein the photosensitive insulation film comprises a positive photosensitive resin.

71. The method of claim 69, wherein the photosensitive insulation film comprises a negative photosensitive resin.

72. The method of claim 69, wherein the first mask includes a plurality of light blocking portions.

73. The method of claim 69, wherein the first mask includes a plurality of light transmitting portions.

74. The method of claim 69, wherein the first and second masks are used to form a plurality of contact holes and a plurality of asperities in the photosensitive insulation film.

75. The method of claim 69, wherein exposure using the first mask provides an exposure amount of from 20 mj to 100 mj, and wherein the exposure using the second mask provides an exposure amount of from 160 mj to 500 mj.

76. The method of claim 69, wherein the steps are performed in the order in which they are recited.

77. The method of claim 69, wherein center-to-center distances between adjoining light transmitting portions of the second mask are in a range of from 5 to 50 μm.

78. The method of claim 69, wherein the display comprises a transmissive/reflective liquid crystal display.

79. The method of claim 69, wherein the exposure using the second mask is performed prior to the exposure using the first mask.

80. The method of claim 69, wherein the photosensitive insulation film is organic.

81. The method of claim 69, wherein the second mask has adjoining light blocking portions, and wherein the center-to-center distances between the adjoining light blocking portions is from 5 to 50 μm.

82. The method of claim 69, wherein the second mask has adjoining circular or polygonal shaped regions and the total area of the circular or polygonal shaped regions in the second mask is more than 20% of the total area of the second mask.

83. The method of claim 69, wherein the second mask has adjoining circular or polygonal shaped regions and the total area of the circular or polygonal shaped regions in the second mask is less than 40% of the total area of the second mask.

84. The method of claim 69, wherein the second mask has adjoining circular or polygonal shaped regions and the total area of the circular or polygonal shaped regions in the second mask is from 20% to 40% of the total area of the second mask.

85. The method of claim 69, wherein the second mask has adjoining circular or polygonal shaped regions and the total area of the circular or polygonal shaped regions in the second mask is 30% of the total area of the second mask.

86. A method of making a liquid crystal display apparatus including a liquid crystal layer between first and second substrates, a reflecting film provided on the first substrate for reflecting incident light, the method comprising:
applying a positive photosensitive resin on the first substrate;
exposing a first region of the photosensitive resin by using a photomask which has circular or polygonal shaped portions that are in a range of from 20% to 40% of the total area of said photomask, and exposing a second region of the photosensitive resin so that an integral of exposure amount to the second region is higher than an integral of exposure amount to the first region;
forming asperities in the first region by developing the first region, and forming a concave portion in the second region by developing the second region so that the concave portion has a thickness smaller than those of the first region;
heat-treating the developed photosensitive resin; and
forming the reflecting film on the heat-treated photosensitive resin.

87. A method of making a liquid crystal display apparatus including a liquid crystal layer between first and second substrates, a reflecting film provided on the first substrate for reflecting incident light, the method comprising:
applying a positive photosensitive resin on the first substrate;
exposing a first region of the photosensitive resin by using a photomask which has circular or polygonal shaped portions that are disposed so that center-to-center distances between adjoining circular or polygonal shaped regions are from 5 to 50 µm, and exposing a second region of the photosensitive resin so that an integral of exposure amount to the second region is higher than an integral of exposure amount to the first region;
forming asperities in the first region by developing the first region, and forming a concave portion in the second region by developing the second region so that the concave portion has a thickness smaller than those of the first region;
heat-treating the developed photosensitive resin; and
forming the reflecting film on the heat-treated photosensitive resin.

88. A method of making a liquid crystal display apparatus including a liquid crystal layer between first and second substrates, a reflecting film provided on the first substrate for reflecting incident light, the method comprising:
applying a positive photosensitive resin on the first substrate;
exposing a first region of the photosensitive resin by using a photomask which has light blocking portions that are in a range of from 20% to 40% of the total area of said photomask, and exposing a second region of the photosensitive resin so that an integral of exposure amount to the second region is higher than an integral of exposure amount to the first region;
forming asperities in the first region by developing the first region, and forming a concave portion in the second region by developing the second region so that the concave portion has a thickness smaller than those of the first region;
heat-treating the developed photosensitive resin; and
forming the reflecting film on the heat-treated photosensitive resin.

89. A method of making a liquid crystal display apparatus including, on one of a pair of substrates disposed so as to be opposed with a liquid crystal layer therebetween, a reflecting film for reflecting incident light, the method comprising:
applying a positive photosensitive resin on one of the substrates;
exposing a first region of the photosensitive resin by using a photomask which has light blocking portions that are disposed so that center-to-center distances between adjacent light blocking portions are from 5 to 50 µm, and exposing a second region of the photosensitive resin so that an integral of exposure amount to the second region is higher than an integral of exposure amount to the first region;
forming asperities in the first region by developing the first region, and forming a concave portion in the second region by developing the second region so that the concave portion has a thickness smaller than those of the first region;
heat-treating the developed photosensitive resin; and
forming the reflecting film on the heat-treated photosensitive resin.

90. A method of making a liquid crystal display apparatus including, on one of a pair of substrates disposed so as to be opposed with a liquid crystal layer therebetween, a reflecting film for reflecting incident light, the method comprising:
applying a negative photosensitive resin on one of the substrates;
exposing a first region of the photosensitive resin by using a photomask which has circular or polygonal shaped portions that are in a range of from 20% to 40% of the total area of said photomask, and exposing a second region of the photosensitive resin so that an integral of exposure amount to the first region is higher than an integral of exposure amount to the second region;
forming asperities in the first region by developing the first region, and removing the photosensitive resin in the second region by developing the second region;
heat-treating the developed photosensitive resin; and
forming the reflecting film on the heat-treated photosensitive resin.

91. A method of making a liquid crystal display apparatus including, on one of a pair of substrates disposed so as to be opposed with a liquid crystal layer therebetween, a reflecting film for reflecting incident light, the method comprising:
applying a negative photosensitive resin on one of the substrates;
exposing a first region of the photosensitive resin by using a photomask which has circular or polygonal shaped portions that are disposed so that center-to-center distances between adjacent circular or polygonal shaped portions are in a range of from 5 to 50 µm, and exposing a second region of the photosensitive resin so that an integral of exposure amount to the first region is higher than an integral of exposure amount to the second region;
forming asperities in the first region by developing the first region, and removing the photosensitive resin in the second region by developing the second region;
heat-treating the developed photosensitive resin; and
forming the reflecting film on the heat-treated photosensitive resin.

92. A method of making a liquid crystal display apparatus including, on one of a pair of substrates disposed so as to be opposed with a liquid crystal layer therebetween, a reflecting film for reflecting incident light, the method comprising:
applying a negative photosensitive resin on one of the substrates;

exposing a first region of the photosensitive resin by using a photomask which has light transmitting portions which collectively have an area of from 20% to 40% of the total area of said photomask, and exposing a second region of the photosensitive resin so that an integral of exposure amount to the first region is higher than an integral of exposure amount to the second region;

forming asperities in the first region by developing the first region, and removing the photosensitive resin in the second region by developing the second region;

heat-treating the developed photosensitive resin; and forming the reflecting film on the heat-treated photosensitive resin.

93. A method of making a liquid crystal display apparatus including, on one of a pair of substrates disposed so as to be opposed with a liquid crystal layer therebetween, a reflecting film for reflecting incident light, the method comprising:

applying a negative photosensitive resin on one of the substrates;

exposing a first region of the photosensitive resin by using a photomask which has light transmitting portions that are disposed so that center-to-center distances between adjacent light transmitting portions are in a range of from 5 to 50 μm, and exposing a second region of the photosensitive resin so that an integral of exposure amount to the first region is higher than an integral of exposure amount to the second region;

forming asperities in the first region by developing the first region, and removing the photosensitive resin in the second region by developing the second region;

heat-treating the developed photosensitive resin; and forming the reflecting film on the heat-treated photosensitive resin.

94. A method for fabricating a reflection type liquid crystal display, comprising steps of:

forming a switching element having a source, a drain, and a gate on an insulation substrate;

depositing a photosensitive organic insulation film to a first thickness onto the insulation substrate;

performing a first exposure for a first time period using a first mask such that the photosensitive organic insulation film on a portion of the drain is completely exposed;

performing a second exposure for a second time period using a second mask such that the photosensitive organic insulation film is exposed to a depth shallower than that of the first exposure;

developing and removing the first exposed portion and the second exposed portion;

heating the photosensitive organic insulation film; and forming a reflection electrode onto a selected portion of the photosensitive organic insulation film.

95. The method of claim 94, wherein the second mask is for an irregularly disposed circle pattern.

96. A method for fabricating a liquid crystal display, the method comprising:

depositing a negative photosensitive insulation film on a substrate;

as part of forming a contact hole which extends all the way through the photosensitive insulation film, exposing part of the negative photosensitive insulation film using a first mask including a light blocking portion and a light transmitting portion;

as part of forming asperities in a surface of the photosensitive insulation film which do not extend all the way through the photosensitive insulation film, exposing part of the negative photosensitive insulation film using a second mask including a light blocking portion and a light transmitting portion, wherein exposures using the first mask and the second mask, respectively, are of different exposure amounts;

developing and removing parts of the negative photosensitive insulation film so as to form at least the contact hole and the asperities in the photosensitive insulation film;

heating the photosensitive insulation film; and forming a reflection electrode on a selected portion of the photosensitive insulation film on the substrate, so that the reflection electrode is located over at least some of the asperities and is in electrical communication with a transistor via the contact hole.

97. The method of claim 96, wherein the first exposure provides an exposure amount of from 20 mj to 100 mj, and wherein the second exposure provides an exposure amount of from 160 mj to 500 mj.

98. The method of claim 96, wherein the steps are performed in the order in which they are recited.

99. The method of claim 96, wherein center-to-center distances between adjoining light transmitting portions of the second mask are in a range of from 5 to 50 μm.

100. The method of claim 96, wherein the display comprises a transmissive/reflective liquid crystal display.

101. The method of claim 96, wherein the exposure using the second mask is performed prior to the exposure using the first mask.

102. A manufacturing method for a reflection type liquid crystal display having a reflection film for reflecting light having passed through a liquid crystal layer, the method comprising:

forming a thin film transistor on a substrate;

forming a photosensitive resin film on the thin film transistor;

exposing the photosensitive resin film with a first unit exposure light amount via a first mask;

exposing the photosensitive resin film with a second unit exposure light amount via a second mask;

developing the photosensitive resin film subjected to two exposures thereby forming two types of concaves having different depths; and forming a film using a reflective material on the photosensitive resin developed to have two types of concaves, thereby forming the reflection film;

wherein the photosensitive resin film constitutes an insulating film, the reflection film is a reflection electrode having a size corresponding to a pixel, and the reflection electrode is electrically connected to the thin film transistor, and wherein the first unit exposure light amount is larger than the second unit exposure light amount, the concave formed using the first mask constitutes a contact hole for electrically connecting the reflection electrode and the thin film transistor, and the concave formed using the second mask constitutes a concave formed on a surface of the reflection electrode.

103. A manufacturing method according to claim 102, further comprising heating the photosensitive resin film to give edges of the concave a gentler slope after developing the photosensitive resin film.

104. A manufacturing method for a reflection type liquid crystal display having a reflection film for reflecting light having passed through a liquid crystal layer, the method comprising:

forming a thin film transistor on a substrate;

forming a photosensitive resin film on the thin film transistor;

exposing the photosensitive resin film with a first unit exposure light amount via a first mask;

exposing the photosensitive resin film with a second unit exposure light amount via a second mask;

developing the photosensitive resin film subjected to two exposures thereby forming two types of concaves having different depths; and forming a film using a reflective material on the photosensitive resin developed to have two types of concaves, thereby forming the reflection film;

wherein the photosensitive resin film constitutes an insulating film, the reflection film is a reflection electrode having a size corresponding to a pixel, and the reflection electrode is electrically connected to the thin film transistor, and wherein the second unit exposure light amount is larger than the first unit exposure light amount, the concave formed using the first mask constitutes a concave formed on a surface of the reflection electrode, and the concave formed using the second mask constitutes a contact hole for electrically connecting the reflection electrode and the thin film transistor.

105. A manufacturing method according to claim 104, further comprising heating the photosensitive resin film to give edges of the concave a gentler slope after developing the photosensitive resin film.

106. A manufacturing method for a reflection type liquid crystal display having a plurality of reflection electrodes for reflecting light having passed through a liquid crystal layer, the method comprising:

forming a lower conductive film on a substrate;

forming a photosensitive resin film on a thin film transistor;

exposing the photosensitive resin film with a first unit exposure light amount via a first mask and exposing the photosensitive resin film with a second unit exposure light amount which is greater than the first unit exposure light amount via a second mask at a different timing;

developing the photosensitive resin film subjected to two exposures to simultaneously form a contact hole and a concave on a surface; and forming a film using a reflective material on the photosensitive resin film to thereby form the reflection electrodes;

wherein the reflection electrodes connect with the lower conductive film via the contact hole and have a concave on a surface due to the concave of the photosensitive resin film.

107. The manufacturing method according to claim 106, wherein the thin film transistor is formed on the substrate, and the lower conductive film constitutes the thin film transistor.

108. A manufacturing method according to claim 106, further comprising heating the photosensitive resin film to give edges of the concave a gentler slope after developing the photosensitive resin film.

109. A manufacturing method according to claim 106, wherein the exposing the photosensitive resin film with the first unit exposure light amount is performed in advance of the exposing the photosensitive resin film with the second unit exposure light amount.

110. A manufacturing method according to claim 106, wherein the exposing the photosensitive resin film with the second unit exposure light amount is performed in advance of the exposing the photosensitive resin film with the first unit exposure light amount.

* * * * *